(12) United States Patent
Nanri

(10) Patent No.: US 9,791,004 B2
(45) Date of Patent: Oct. 17, 2017

(54) DISC BRAKE

(71) Applicant: HITACHI AUTOMOTIVE SYSTEMS, LTD., Hitachinaka-shi, Ibaraki (JP)

(72) Inventor: Keisuke Nanri, MinamiALPS (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 2 days.

(21) Appl. No.: 14/198,781

(22) Filed: Mar. 6, 2014

(65) Prior Publication Data

US 2014/0251737 A1   Sep. 11, 2014

(30) Foreign Application Priority Data

Mar. 6, 2013   (JP) ................................ 2013-044322

(51) Int. Cl.
*F16D 65/097* (2006.01)
*F16D 65/00* (2006.01)
(Continued)

(52) U.S. Cl.
CPC .......... *F16D 65/0068* (2013.01); *B60T 1/065* (2013.01); *F16D 55/22* (2013.01);
(Continued)

(58) Field of Classification Search
CPC ..... F16D 2250/0084; F16D 2055/0016; F16D 2055/0091; F16D 65/095; F16D 55/226;
(Continued)

(56) References Cited

U.S. PATENT DOCUMENTS 4,061,209 A * 12/1977 Gee ................... F16D 55/22655
188/73.36
6,725,981 B1 * 4/2004 Franz ................ F16D 55/22655
188/73.31
(Continued)

FOREIGN PATENT DOCUMENTS

DE         4133486        4/1993
DE    102007006472       11/2007
(Continued)

OTHER PUBLICATIONS

Search Report issued in EP Application No. 14158055.5 on Jun. 23, 2014.
(Continued)

*Primary Examiner* — Bradley King
*Assistant Examiner* — Stephen Bowes
(74) *Attorney, Agent, or Firm* — Nixon & Vanderhye P.C.

(57) ABSTRACT

A disc brake includes a pair of end-side connector parts that connect a pair of cylinder parts across over a disc rotor, and an intermediate connector part that is installed between the end-side connector parts and that connects the pair of cylinder parts across over the disc rotor and brake pads. The brake pads are provided with protrusion segments that are formed at positions that are outer end sides in a rotor radial direction and that protrude in directions separated from middle portions of the brake pads in a rotor rotational direction, and the end-side connector parts are provided with pad engaging faces on which inner regions in the rotor radial direction of the protrusion segments are oppositely disposed and which are formed of the same member as a caliper main body.

13 Claims, 25 Drawing Sheets

(51) Int. Cl.
    *B60T 1/06*     (2006.01)
    *F16D 55/228*     (2006.01)
    *F16D 65/095*     (2006.01)
    *F16D 55/22*     (2006.01)
    *F16D 55/00*     (2006.01)
    *F16D 121/02*     (2012.01)

(52) U.S. Cl.
    CPC ......... *F16D 55/228* (2013.01); *F16D 65/095* (2013.01); *F16D 2055/0016* (2013.01); *F16D 2055/0091* (2013.01); *F16D 2121/02* (2013.01)

(58) Field of Classification Search
    CPC ............. F16D 65/0973; F16D 65/0974; F16D 65/0977; F16D 65/0978
    See application file for complete search history.

(56) References Cited

U.S. PATENT DOCUMENTS 7,014,018 B2 *   3/2006   Beringer .................... 188/73.45

2006/0054430 A1 *   3/2006   Maehara ............. F16D 55/2262 188/73.36
2007/0158143 A1 *   7/2007   Valvano et al. ............. 188/71.5
2007/0240946 A1 *   10/2007   Schorn et al. ............. 188/73.38
2008/0023276 A1 *   1/2008   Schorn et al. ............... 188/72.4
2009/0236187 A1   9/2009   Bach et al.
2010/0170755 A1   7/2010   Biggs

FOREIGN PATENT DOCUMENTS

| DE | 102008029582 | 4/2009 |
|---|---|---|
| JP | 2001-254768 | 9/2001 |
| JP | 2005-023977 | 1/2005 |
| JP | 2009-068593 | 4/2009 |
| WO | 2009/050226 | 4/2009 |

OTHER PUBLICATIONS

May 9, 2017 Decision of Rejection issued in Japanese Application No. 2013-044322 (with translation).

* cited by examiner

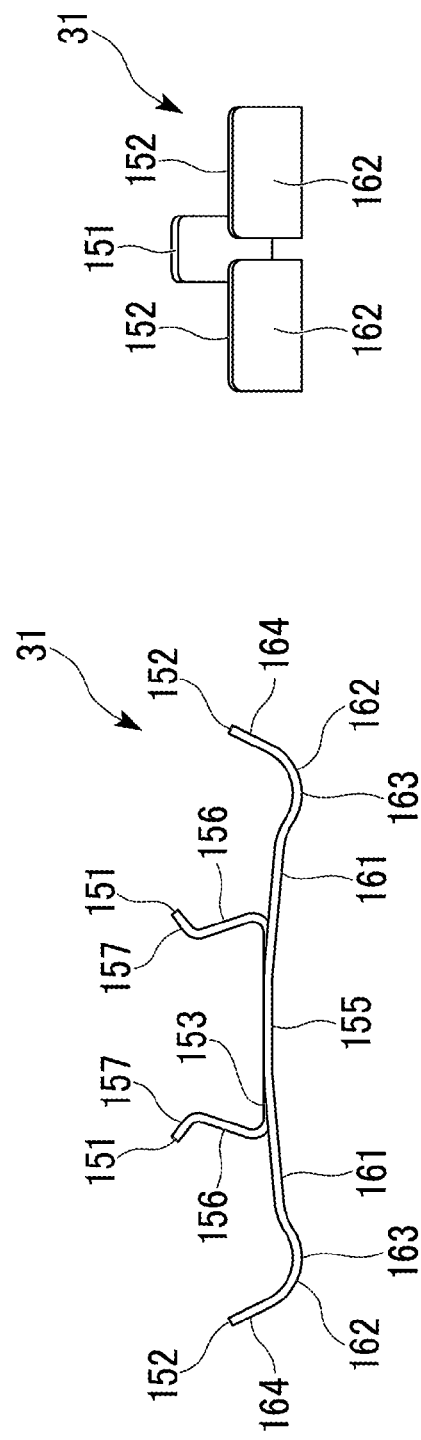

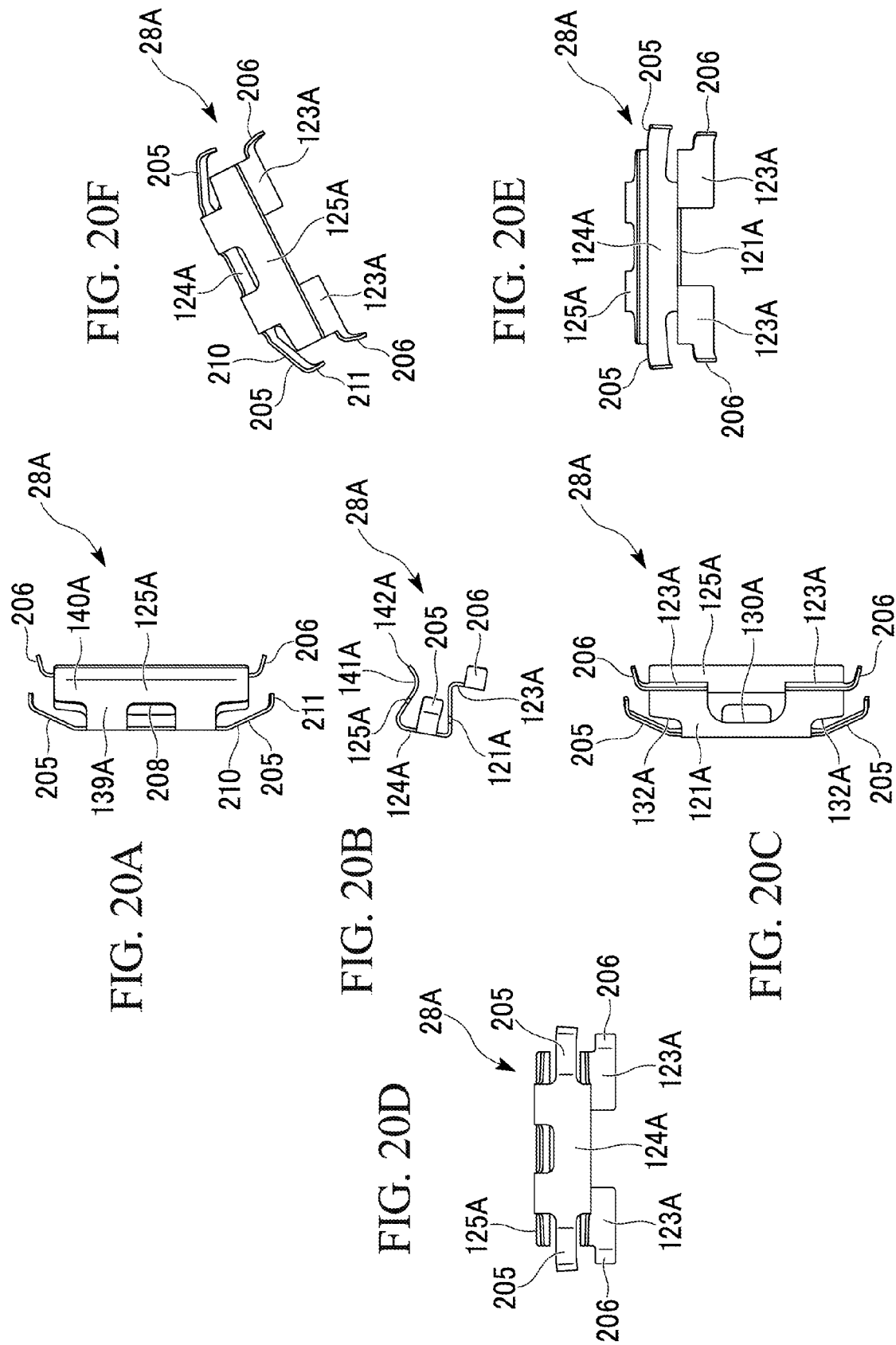

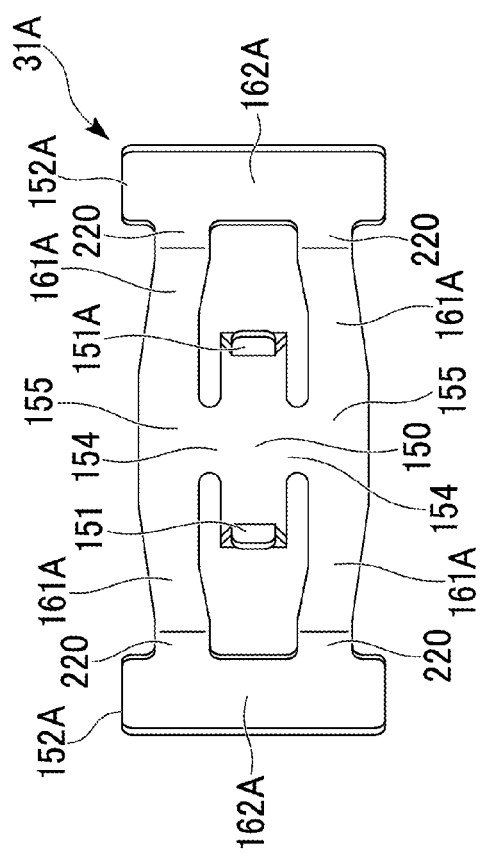
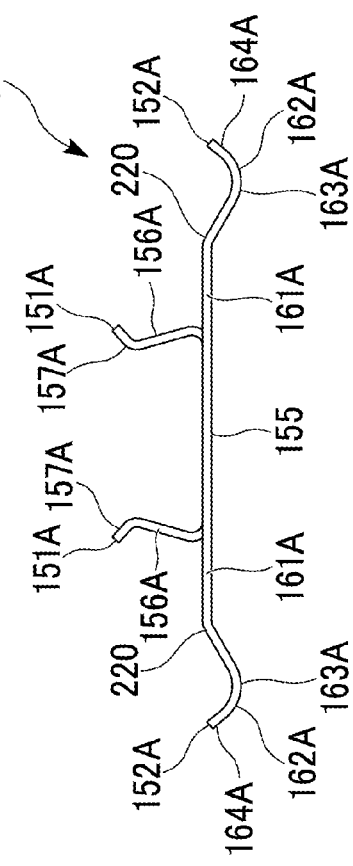
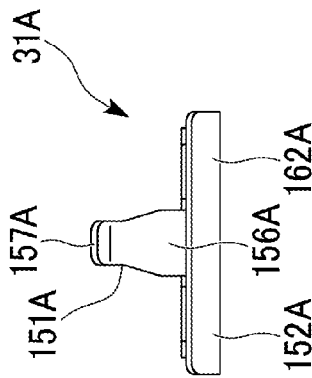

DISC BRAKE

BACKGROUND OF THE INVENTION

Field of the Invention

The present invention relates to a disc brake used to break a vehicle such as a two-wheeled vehicle or a four-wheeled vehicle.

Priority is claimed on Japanese Patent Application No. 2013-044322, filed on Mar. 6, 2013, the content of which is incorporated herein by reference.

Description of Related Art

There is a disc brake in which a pair of torque receiving sleeves are provided between a pair of connector parts connecting both ends of outer and inner body parts of a caliper, and pads are supported by the pair of torque receiving sleeves (e.g., see Japanese Unexamined Patent Application, First Publication No. 2009-68593).

The disc brake has a structure in which the pair of torque receiving sleeves is installed on the caliper by a pair of torque receiving pins and a pair of nuts. As such, weight of the disc brake is increased.

SUMMARY OF THE INVENTION

The present invention provides a disc brake whose weight can be reduced.

According to a first aspect of the present invention, a disc brake includes at least one pair of brake pads disposed to be opposite to a disc rotor, and a caliper main body configured to support the brake pads so as to be capable of being pressed to the disc rotor. The caliper main body includes a pair of cylinder parts in which pistons adopted to press the brake pads are housed, a pair of end-side connector parts configured to extend over the disc rotor at ends in a rotor rotational direction of the pair of cylinder parts and to connect the pair of cylinder parts, and an intermediate connector part installed between the pair of end-side connector parts and to connect the pair of cylinder parts across over the disc rotor and the pair of brake pads. At least one of the pair of brake pads includes protrusion segments that are formed at positions that are outer end sides in a rotor radial direction and that protrude in directions separated from middle portions of the brake pads in the rotor rotational direction. The pair of end-side connector parts includes pad engaging faces on which inner regions in the rotor radial direction of the protrusion segments are oppositely disposed and which are formed of the same member as the caliper main body.

According to a second aspect of the present invention, a disc brake includes at least one pair of brake pads disposed to be opposite to a disc rotor, and a caliper main body configured to support the brake pads so as to be capable of being pressed to the disc rotor. The caliper main body is configured such that a pair of cylinder parts in which pistons adopted to press the brake pads are housed, a pair of end-side connector parts configured to extend over the disc rotor at ends in a rotor rotational direction of the pair of cylinder parts and to connect the pair of cylinder parts, and an intermediate connector part installed between the pair of end-side connector parts and to connect the pair of cylinder parts across over the disc rotor and the pair of brake pads are formed of the same member. The pair of brake pads includes protrusion segments formed at positions that are outer end sides in a rotor radial direction and to protrude in directions separated from middle portions of the brake pads in the rotor rotational direction. The pair of end-side connector parts include pad engaging faces to which inner regions in the rotor radial direction of the protrusion segments are supported.

According to a third aspect of the present invention, the pair of end-side connector parts include disc path parts through which the disc rotor passes, and pad guides formed at both sides in a rotor axial direction of the disc path parts to guide the pair of brake pads. The brake pads include pad-side cutouts that are formed at inner sides in the rotor radial direction relative to the protrusion segments and that are recessed toward middle sides of the brake pads in the rotor rotational direction.

According to a fourth aspect of the present invention, the pad-side cutouts are formed with such dimensions that, when the pad-side cutouts come into contact with contact positions that are inner regions in the rotor radial direction relative to the pad engaging faces of the end-side connector parts and that match the disc path parts in the rotor axial direction, middle positions of the brake pads in the rotor rotational direction are offset toward the contact positions relative to the center between the pad guides in the rotor rotational direction.

According to a fifth aspect of the present invention, the pad engaging faces include caliper-side cutouts that are formed at positions matching the disc path parts in the rotor axial direction and that are partly recessed toward an outside of the caliper main body in the rotor rotational direction.

According to a sixth aspect of the present invention, the pair of end-side connector parts include disc path parts through which the disc rotor passes, and pad guides formed at both sides in a rotor axial direction of the disc path parts to guide the pair of brake pads. The pad engaging faces include caliper-side cutouts that are formed at positions matching the disc path parts in the rotor axial direction and that are partly recessed toward an outside of the caliper main body in the rotor rotational direction.

According to a seventh aspect of the present invention, contact positions of the caliper-side cutouts are formed with such dimensions that, when inner positions in the rotor radial direction relative to the protrusion segments of the brake pads come into contact with the contact positions of the caliper-side cutouts, the middle positions of the brake pads in the rotor rotational direction are offset toward the contact positions relative to the center between the pad guides in the rotor rotational direction.

According to an eighth aspect of the present invention, a method of manufacturing a disc brake, which is configured to install a pair of brake pads disposed to be opposite to a disc rotor on a caliper main body having a pair of cylinder parts in which pistons facing lateral faces of the disc rotor are housed, a pair of end-side connector parts configured to extend over the disc rotor at ends in a rotor rotational direction of the pair of cylinder parts and to connect the pair of cylinder parts, and an intermediate connector part configured to be installed between the pair of end-side connector parts and to connect the pair of cylinder parts across over the disc rotor, includes, when protrusion segments formed at positions that are outer end sides in a rotor radial direction of at least one of the pair of brake pads so as to protrude in directions separated from middle portions of the brake pads in the rotor rotational direction are supported by pad supports formed on the pair of end-side connector parts, causing the protrusion segments to pass through caliper-side cutouts formed in at least one of the pair of end-side connector parts so as to be partly recessed toward an outside of the caliper main body.

According to a ninth aspect of the present invention, the method of manufacturing a disc brake further includes forming the protrusion segments at ends in the rotor rotational direction, forming the caliper-side cutouts in the pair of end-side connector part, and causing the pair of protrusion segments to pass through the pad-side cutouts together.

According to a tenth aspect of the present invention, the method of manufacturing a disc brake further includes, after the pair of protrusion segments pass through the pad-side cutouts together, shifting the protrusion segments in a rotor axial direction.

According to an eleventh aspect of the present invention, the method of manufacturing a disc brake further includes forming the protrusion segments at ends in the rotor rotational direction, and in a state in which one of the pair of protrusion segments is supported by the pad support, causing the other protrusion segment to pass through the pad-side cutout.

According to the aforementioned disc brake, it is possible to reduce weight of the disc brake.

BRIEF DESCRIPTION OF THE DRAWINGS

FIG. 13A is a plan view showing a pad spring of the disc brake of the first embodiment according to the present invention.

FIG. 13B is a front view showing the pad spring of the disc brake of the first embodiment according to the present invention.

FIG. 13C is a side view showing the pad spring of the disc brake of the first embodiment according to the present invention.

FIG. 20A is a plan view showing a pad retainer of the disc brake of the second embodiment according to the present invention.

FIG. 20B is a side view showing the pad retainer of the disc brake of the second embodiment according to the present invention.

FIG. 20C is a bottom view showing the pad retainer of the disc brake of the second embodiment according to the present invention.

FIG. 20D is a rear view showing the pad retainer of the disc brake of the second embodiment according to the present invention.

FIG. 20E is a front view showing the pad retainer of the disc brake of the second embodiment according to the present invention.

FIG. 20F is a perspective view showing the pad retainer of the disc brake of the second embodiment according to the present invention.

FIG. 21A is a plan view showing a pad spring of the disc brake of the second embodiment according to the present invention.

FIG. 21B is a front view showing the pad spring of the disc brake of the second embodiment according to the present invention.

FIG. 21C is a side view showing the pad spring of the disc brake of the second embodiment according to the present invention.

DETAILED DESCRIPTION OF THE INVENTION

First Embodiment

A disc brake of a first embodiment according to the present invention will be described based on FIGS. 1 to 14.

The disc brake 1 of the first embodiment shown in FIGS. 1 to 6 is a disc brake used to brake a front wheel of a motorcycle, but without being limited thereto, may also be naturally applied, for instance, to a disc brake used to brake a rear wheel of a motorcycle or used to brake a four-wheeled vehicle.

As shown in FIGS. 1 to 6, the disc brake 1 includes a disc rotor 2 that rotates along with a wheel which is a braking target, and a caliper 3 that is mounted on the side of a vehicle body and gives frictional resistance to the disc rotor 2.

Figure 2:
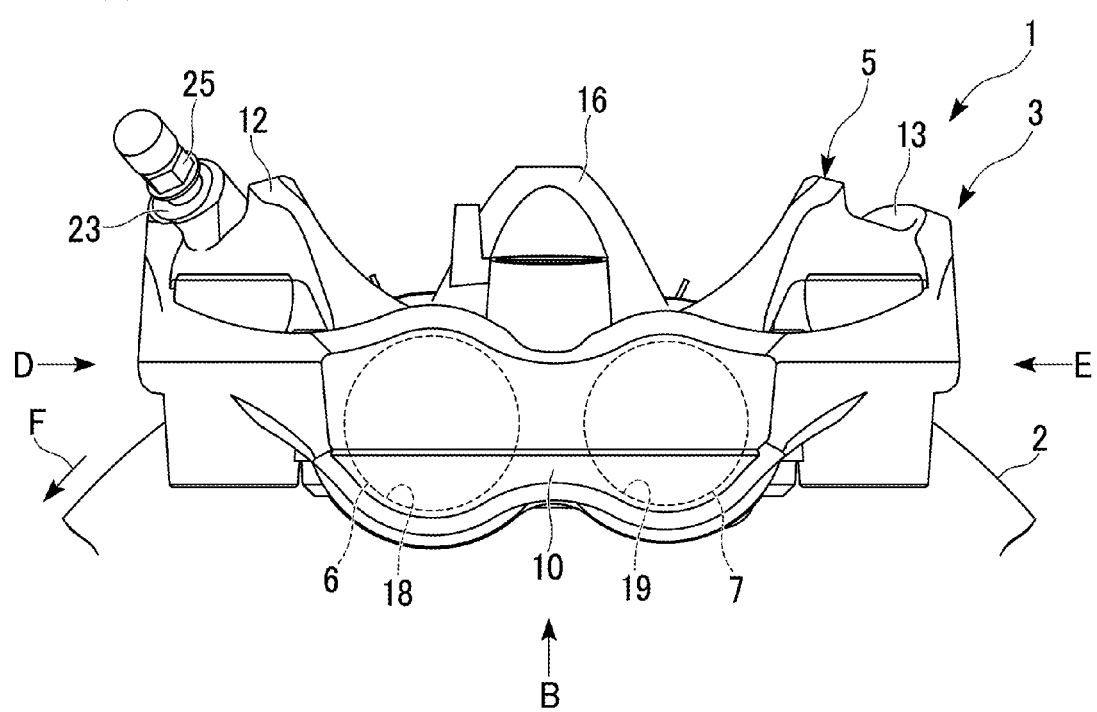
FIG. 2 is a view showing the disc brake of the first embodiment according to the present invention when viewed from arrow A of FIG. 1.
Figure 4:
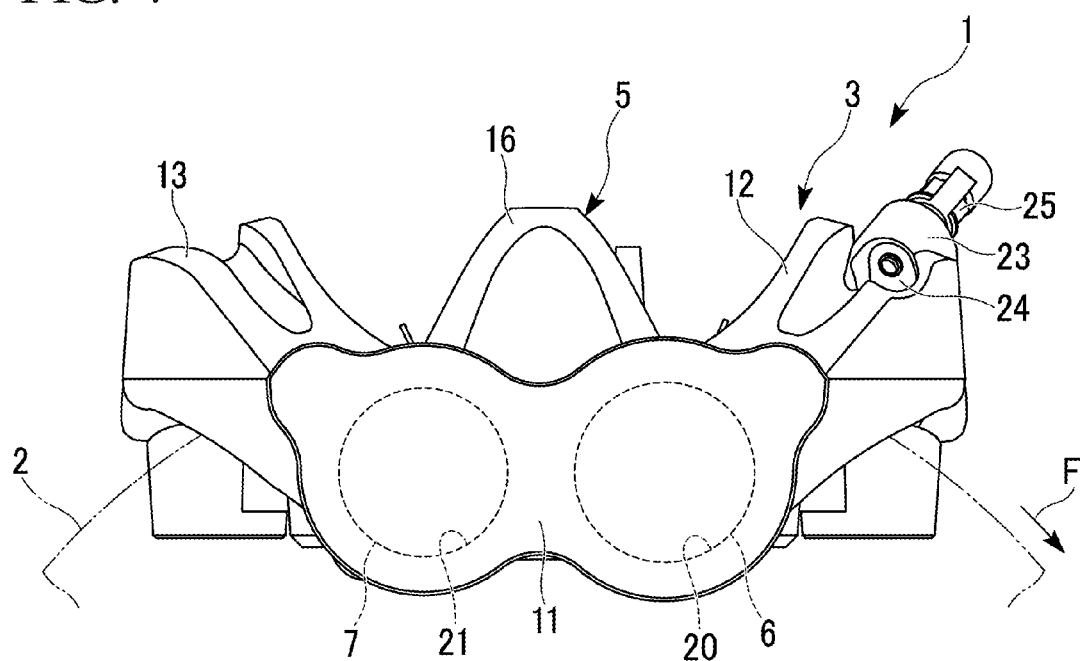
FIG. 4 is a view showing the disc brake of the first embodiment according to the present invention when viewed from arrow C of FIG. 1.

The caliper 3 has a caliper main body 5 that is mounted on the side of the vehicle body across an outer circumference side of the disc rotor 2, a plurality of pistons 6 and 6 which are housed in the caliper main body 5 so as to face the disc rotor 2 and only outer circumferences of which are indicated in FIGS. 2 and 4 by dotted lines, and a plurality of pistons 7 and 7 that are housed in the caliper main body 5 so as to face the disc rotor 2 and are smaller in diameter than the pistons 6 and 6.

To be specific, the two pistons 6 and 6 that are common parts are aligned in radial and rotational directions of the disc rotor 2, and are installed on both sides of an axial direction of the disc rotor 2 in a pair, and the two pistons 7 and 7 that are common parts are aligned in the radial and rotational directions of the disc rotor 2, and are installed on both sides of the axial direction of the disc rotor 2 in a pair. One piston 6 and one piston 7 on one axial side of the disc rotor 2 are provided in parallel at a predetermined interval in the rotational direction of the disc rotor 2. Accordingly, the caliper 3 is formed as an opposed piston type four-pot caliper. Hereinafter, the radial direction of the disc rotor 2 is referred to as a rotor radial direction, the axial direction of the disc rotor 2 is referred to as a rotor axial direction, and the rotational direction (circumferential direction) of the disc rotor 2 is referred to as a rotor rotational direction.

Figure 1:
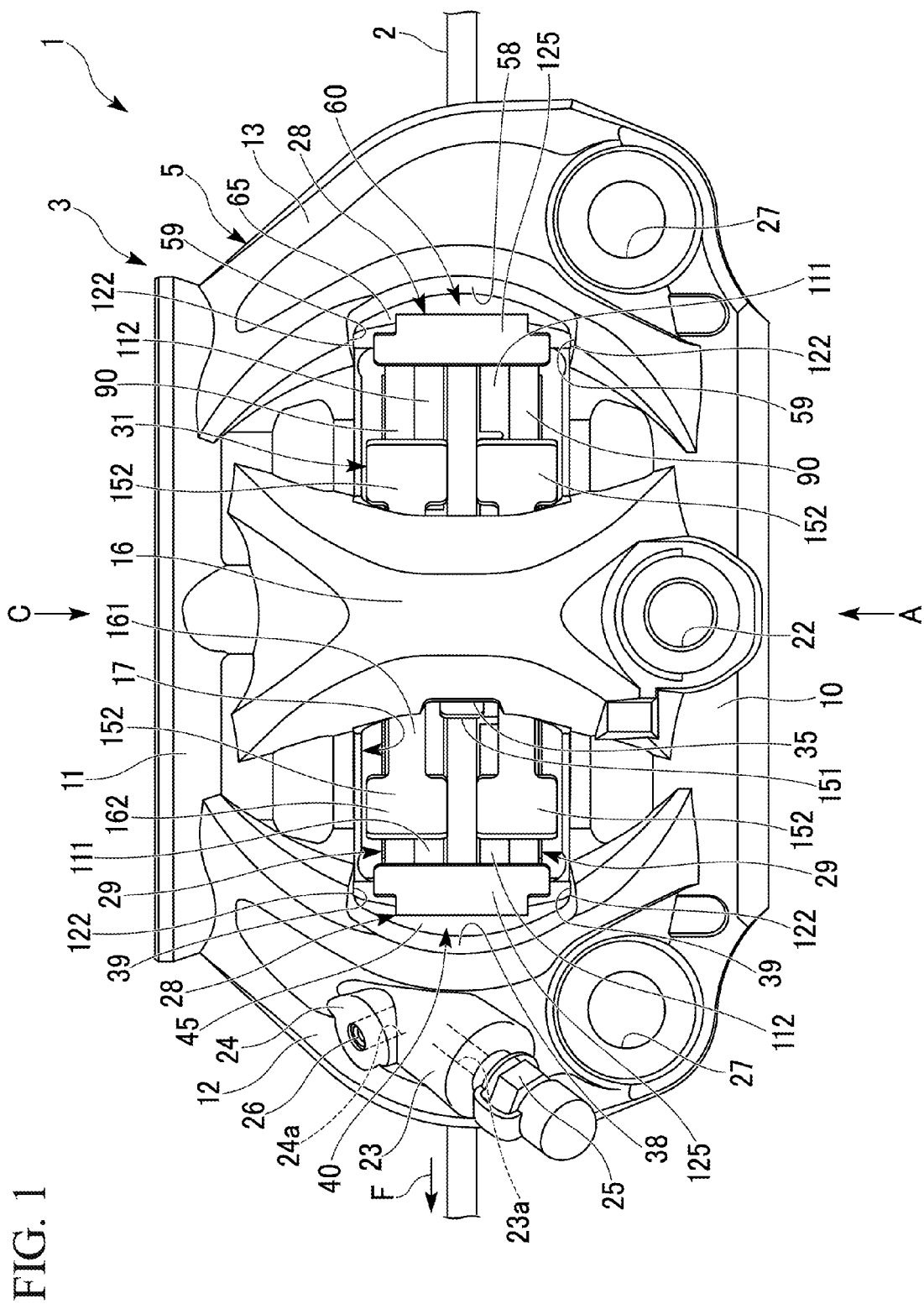
FIG. 1 is a plan view showing a disc brake of a first embodiment according to the present invention.

As shown in FIG. 1, the caliper main body 5 has a pair of cylinder parts 10 and 11 disposed at an outer side (the opposite side of the wheel with respect to the rotor) and an inner side (the side of the wheel with respect to the rotor) of the disc rotor 2, and a pair of end-side connector parts 12 and 13 connecting these cylinder parts 10 and 11. In the present embodiment, a monoblock caliper in which the cylinder parts 10 and 11 and the end-side connector parts 12 and 13 are formed in one body is given as an example. However, the cylinder parts 10 and 11 may be formed in two bodies, and connected by bolts or welding.

As shown in FIGS. 2 and 4 by dotted lines, the cylinder parts 10 and 11 are formed in a long shape in the rotor rotational direction so that each the cylinder parts 10 and 11 is capable of housing the pistons 6 and 7 in parallel in the rotor rotational direction. As shown in FIG. 1, the end-side connector parts 12 and 13 extend over the disc rotor 2 to connect the cylinder parts 10 and 11 on both ends of the pair of cylinder parts 10 and 11 in the rotor rotational direction. Alternatively, the pistons 6 and 7 may be at least one pair, three pairs, four pairs, or have different numbers on the left and right.

Figure 3:
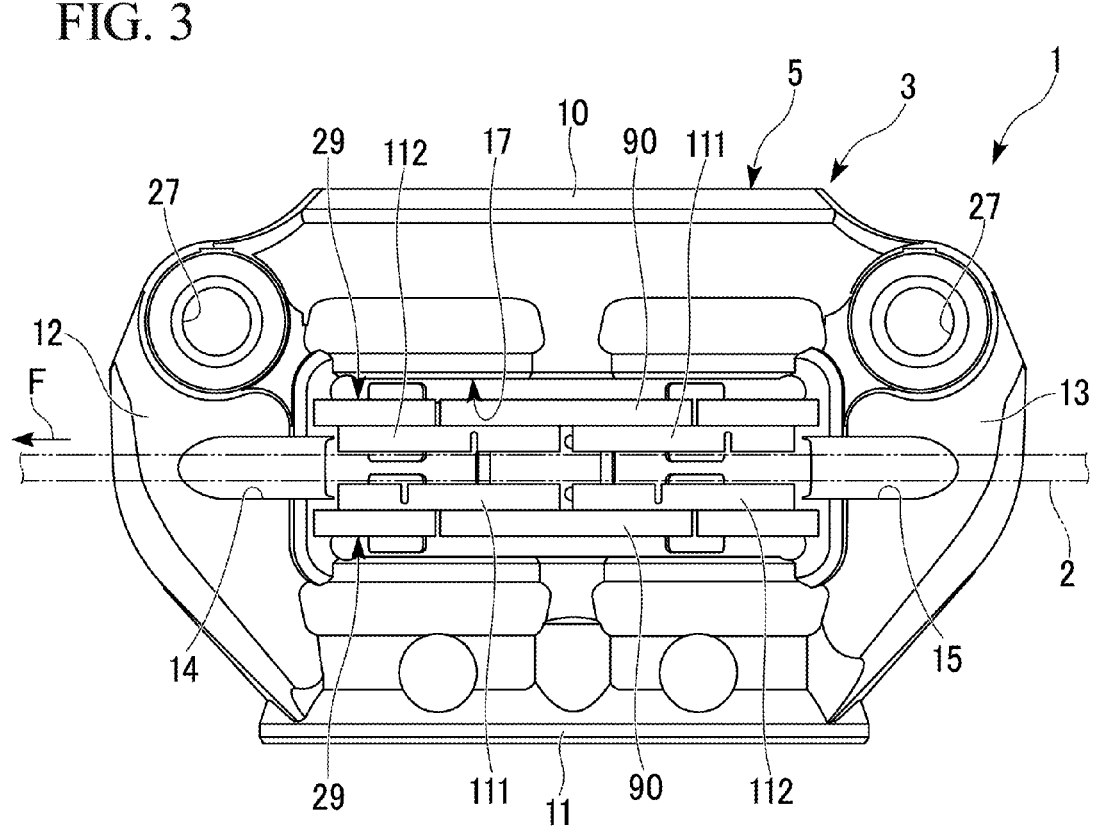
FIG. 3 is a view showing the disc brake of the first embodiment according to the present invention when viewed from arrow B of FIG. 2.
Figure 5:
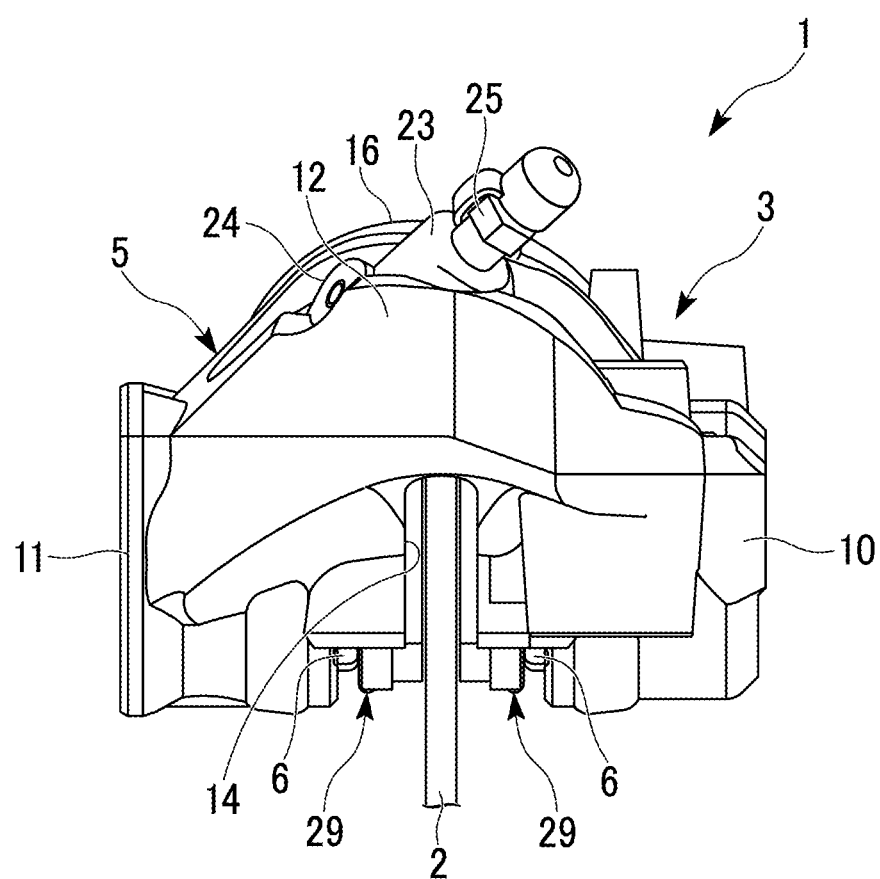
FIG. 5 is a view showing the disc brake of the first embodiment according to the present invention when viewed from arrow D of FIG. 2.
Figure 6:
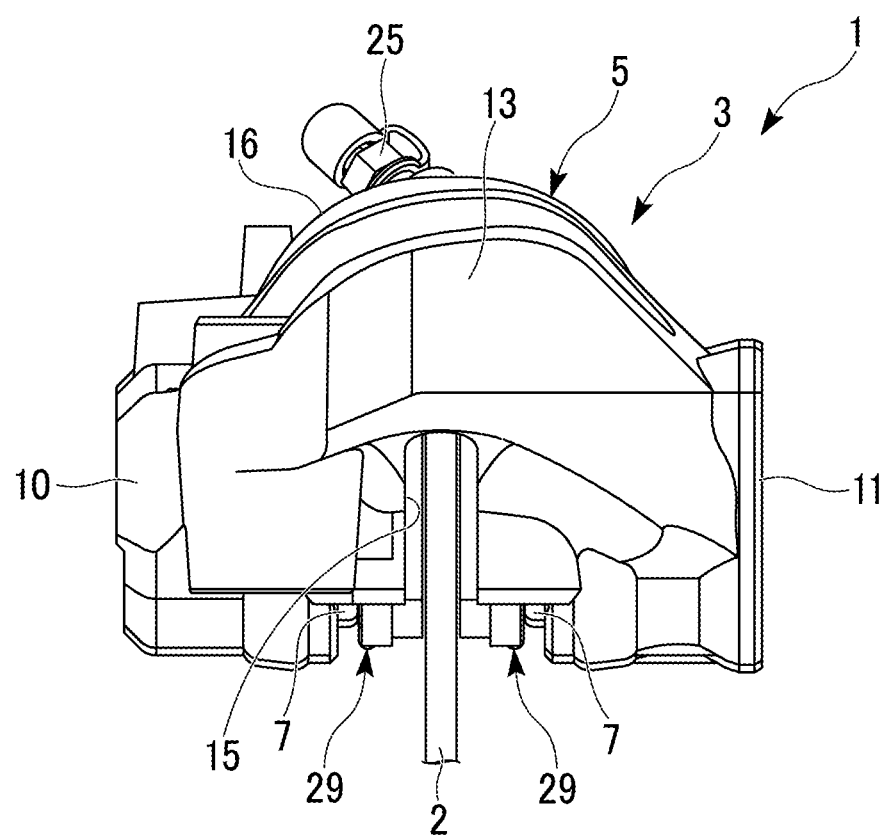
FIG. 6 is a view showing the disc brake of the first embodiment according to the present invention when viewed from arrow E of FIG. 2.

As shown in FIGS. 3 and 5, the end-side connector part 12 is provided with a disc path part 14 that is dented in the approximate middle in the rotor axial direction from the inner side toward the outer side in the rotor radial direction. The disc path part 14 is disposed so that the outer circumference side of the disc rotor 2 faces. As shown in FIGS. 3 and 6, the end-side connector part 13 is provided with a disc path part 15 that is dented in an approximate middle in the rotor axial direction from the inner side toward the outer side in the rotor radial direction. The disc rotor 2 is disposed to pass through the disc path part 15. As shown in FIG. 3, the caliper main body 5 is provided with a pad assembling space 17 that is surrounded by the cylinder parts 10 and 11 and the end-side connector parts 12 and 13 and is open on both sides in the rotor radial direction in the approximate middle thereof. The disc path parts 14 and 15 are located at both outer sides in the rotor rotational direction relative to the pad assembling space 17, and are open at the middle position of the pad assembling space 17 in the rotor axial direction.

As shown in FIG. 1, the caliper main body 5 is provided with an intermediate connector part (connector part) 16 between the pair of end-side connector parts 12 and 13. The intermediate connector part 16 extends over the disc rotor 2 at an outer side in the rotor radial direction, and connects the pair of cylinder parts 10 and 11. The intermediate connector part 16 is installed at the middle position of the caliper main body 5 in the rotor rotational direction, and is provided across the pad assembling space 17 in the rotor axial direction at the outer side in the rotor radial direction. Accordingly, the outer side of the pad assembling space 17 in the rotor radial direction is configured such that a portion between the end-side connector part 12 located at one side in the rotor rotational direction and the intermediate connector part 16 and a portion between the end-side connector part 13 located at the other side in the rotor rotational direction and the intermediate connector part 16 are open. Further, the intermediate connector part 16 is preferably installed at a position equidistant from the end-side connector parts 12 and 13 in the aspect of rigidity, bilateral symmetry of each part, and so on. However, the intermediate connector part 16 may be installed at a position closer to one side as needed.

As shown in FIG. 2 by dotted lines, the outer-side cylinder part 10 of the caliper main body 5 is provided with a cylinder bore 18 housing the piston 6 and a cylinder bore 19 housing the piston 7. Further, as shown in FIG. 4 by dotted lines, the inner-side cylinder part 11 is also provided with a cylinder bore 20 housing the piston 6 and a cylinder bore 21 housing the piston 7. These cylinder bores 18 to 21 open toward the pad assembling space 17 shown in FIG. 3. In other words, the cylinder bores 18 to 21 open toward the side facing the disc rotor 2. Central axes of the cylinder bores 18 and 20 having large diameters are in line with each other. Further, central axes of the cylinder bores 19 and 21 whose inner circumferences are shown in FIGS. 2 and 4 by dotted lines and which have small diameters are also in line with each other. The paired cylinder bores 18 and 20 and the paired cylinder bores 19 and 21 are formed in parallel apart from each other in the rotor rotational direction. The pistons 6 and 6 are movably disposed in the cylinder bores 18 and 20, and the pistons 7 and 7 are movably disposed in the cylinder bores 19 and 21.

As shown in FIG. 1, a supply/discharge port 22 is drilled in the outer-side cylinder part 10 at the middle position in the rotor rotational direction. The supply/discharge port 22 is formed parallel to a line (hereinafter referred to as a "radial reference line") that passes through the center of the disc rotor 2 and the center of the caliper main body 5 in the rotor rotational direction to run along the rotor radial direction. A brake hose (not shown) for supplying/discharging a brake fluid from/to the outside is connected to the supply/discharge port 22. The supply/discharge port 22 communicates with both of the cylinder bores 18 and 19 that are two places formed in the outer-side cylinder part 10 and are shown in FIG. 2 by a dotted line. The inner-side cylinder part 11 shown in FIG. 4 by a dotted line is provided with a communicating passage (not shown) that causes the cylinder bores 20 and 21 shown in FIG. 4 by dotted lines to communicate with each other.

As shown in FIGS. 1 and 2, a passage protrusion 23 of an approximately cylindrical shape which protrudes outward in the rotor rotational direction, toward the outer side, and outward in the rotor radial direction is formed at the outer side in the rotor radial direction of one end-side connector part 12. Further, as shown in FIG. 1, a passage protrusion 24 of an approximately cylindrical shape which partly protrudes outward in the rotor rotational direction, toward the inner side, and outward in the rotor radial direction is formed at an inner side of the passage protrusion 23.

A communicating passage 23a is drilled in the passage protrusion 23 toward the cylinder part 11. A bleeder plug 25 for bleeding air is mounted on an outer portion of the passage protrusion 23. A communicating passage 24a is drilled in the passage protrusion 24 toward the cylinder part 10. A spherical blockage plug 26 blocking the communicating passage 24a is mounted on an outer portion of the passage protrusion 24. These communicating passages 23a and 24a intersect each other in the caliper main body 5, and cause the cylinder bore 18 shown in FIG. 2 and the cylinder bore 20 shown in FIG. 4, both of which are located at the side of the passage protrusion 23 in the rotor rotational direction, to communicate with each other. The brake fluid introduced into the supply/discharge port 22 shown in FIG. 1 is supplied to the cylinder bores 18 to 21 shown in FIGS. 2 and 4 by the communicating passages 23a and 24a.

As shown in FIGS. 1 and 3, the outer-side cylinder part 10 is provided with mounting holes 27 and 27 that are formed in two places, i.e., on both sides in the rotor rotational direction, and pass through the cylinder part 10 in the rotor radial direction. These mounting holes 27 and 27 are formed parallel to the radial reference line, and are formed at positions equidistant from the center of the caliper main body 5 in the rotor rotational direction with positions thereof aligned with each other in the rotor axial direction. The caliper 3 is fixed to the vehicle body side of the vehicle by mounting bolts (not shown) inserted into the mounting holes 27 and 27, i.e., is formed in a so-called radial mount type. The mounting holes may be modified depending on the vehicle body to which the caliper 3 is fixed, and may not necessarily be formed parallel to the radial reference line. Further, the mounting holes may not be formed at the positions equidistant from the center of the caliper main body 5 in the rotor rotational direction, and the positions thereof may not be formed to be aligned with each other in the rotor axial direction. In other words, the mounting holes may be formed to be inclined with respect to the radial reference line. Further, the mounting holes may be located at different distances from the center of the caliper main body 5 in the rotor rotational direction, and be provided with the positions thereof shifted in the rotor axial direction.

Figure 7:
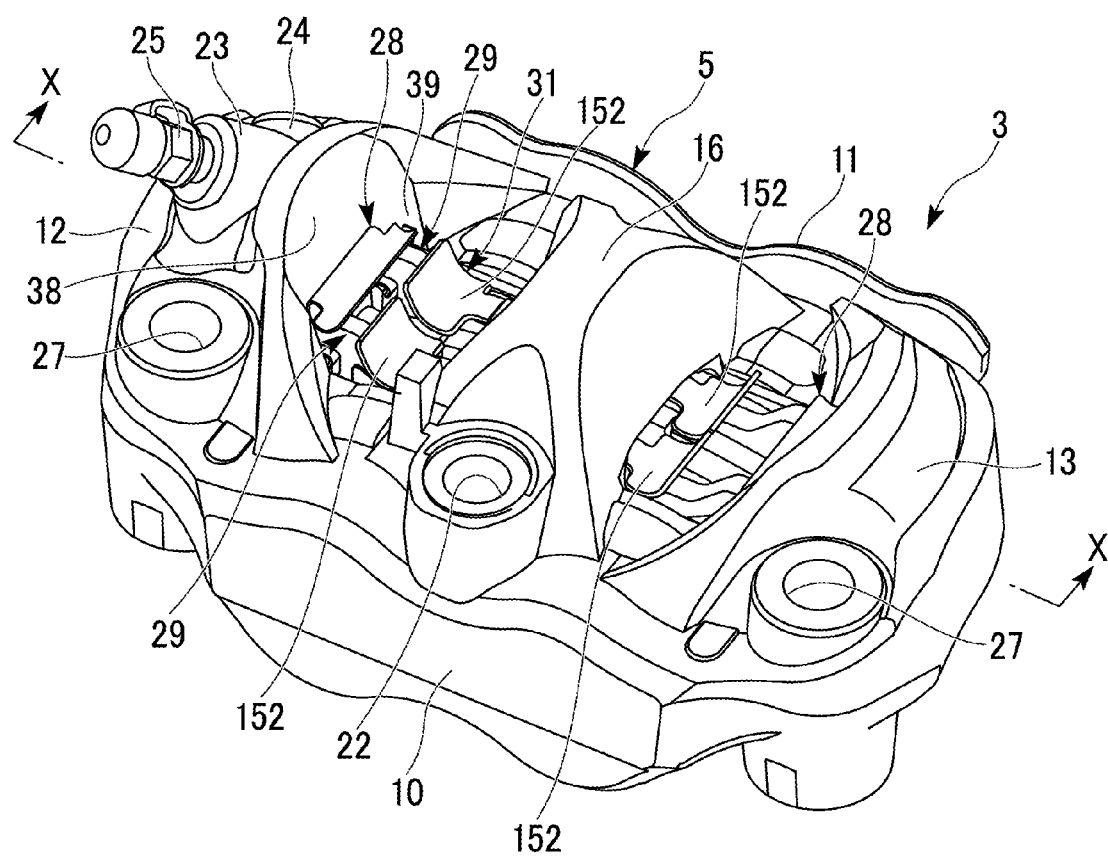
FIG. 7 is a perspective view showing a caliper of the disc brake of the first embodiment according to the present invention.
Figure 8:
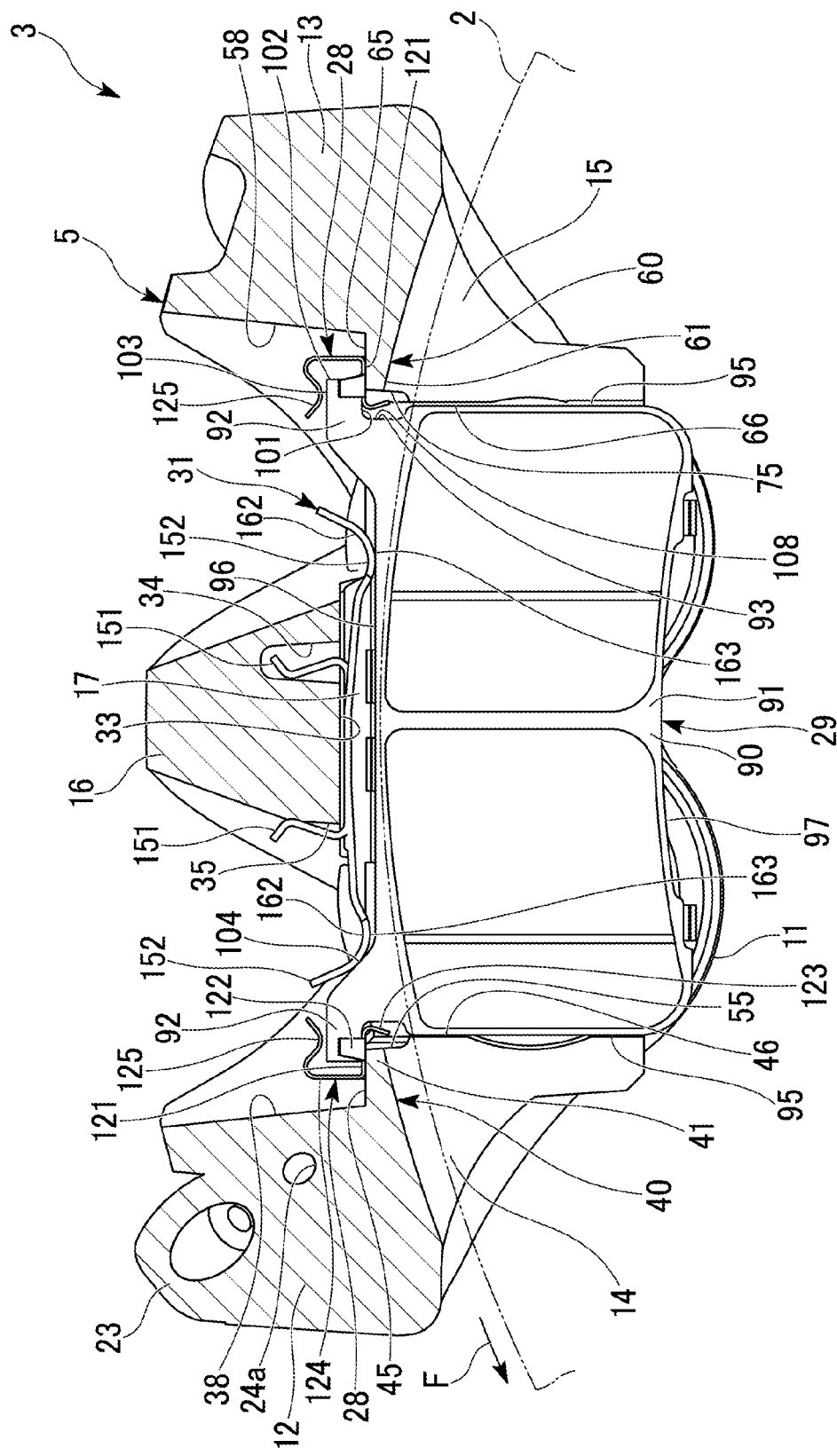
FIG. 8 is a cross-sectional view showing the caliper of the disc brake of the first embodiment according to the present invention when taken along line X-X of FIG. 7.
Figure 9:
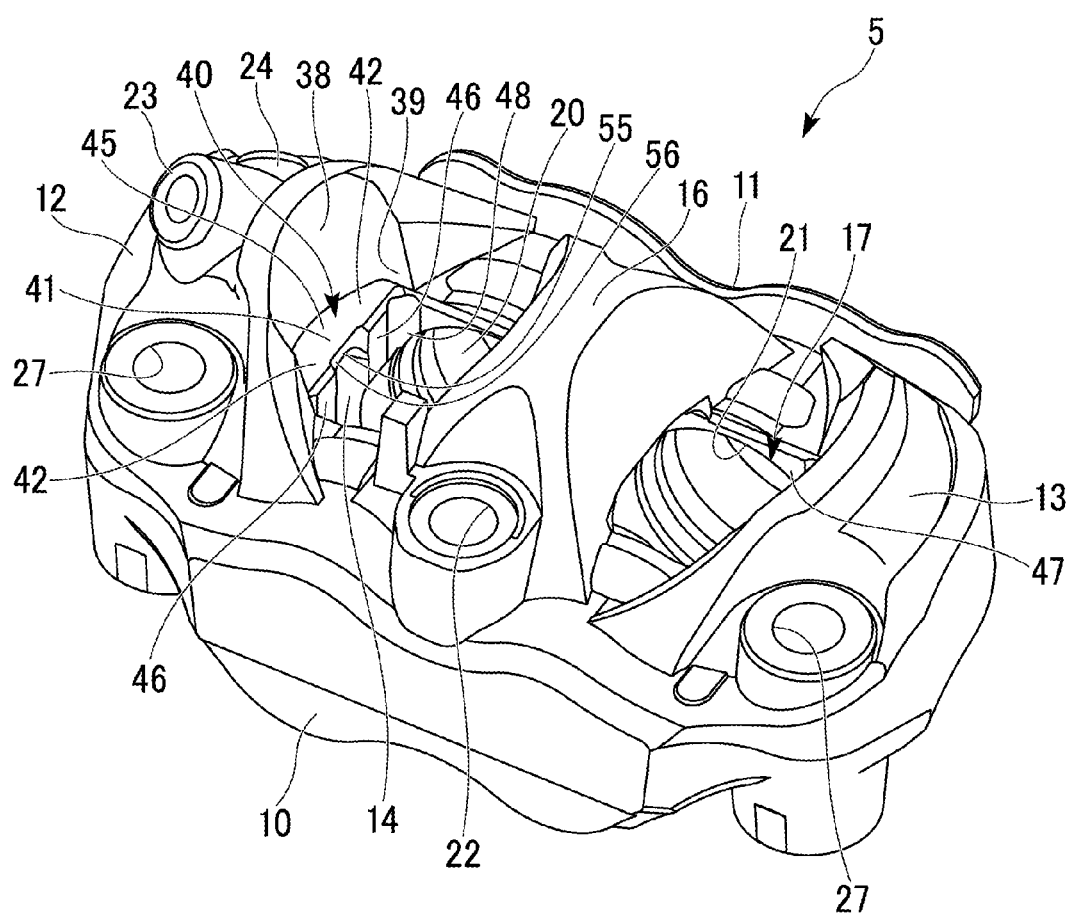
FIG. 9 is a perspective view showing a caliper main body of the disc brake of the first embodiment according to the present invention.
Figure 10:
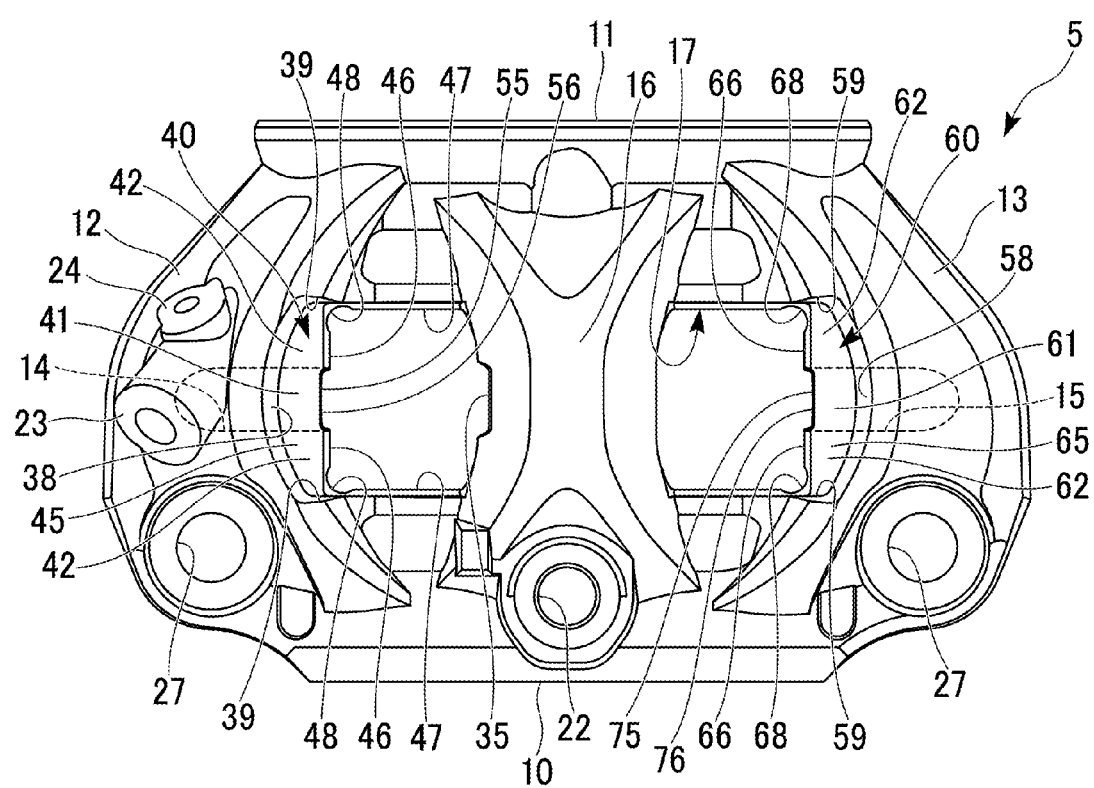
FIG. 10 is a plan view showing the caliper main body of the disc brake of the first embodiment according to the present invention.
Figure 14:
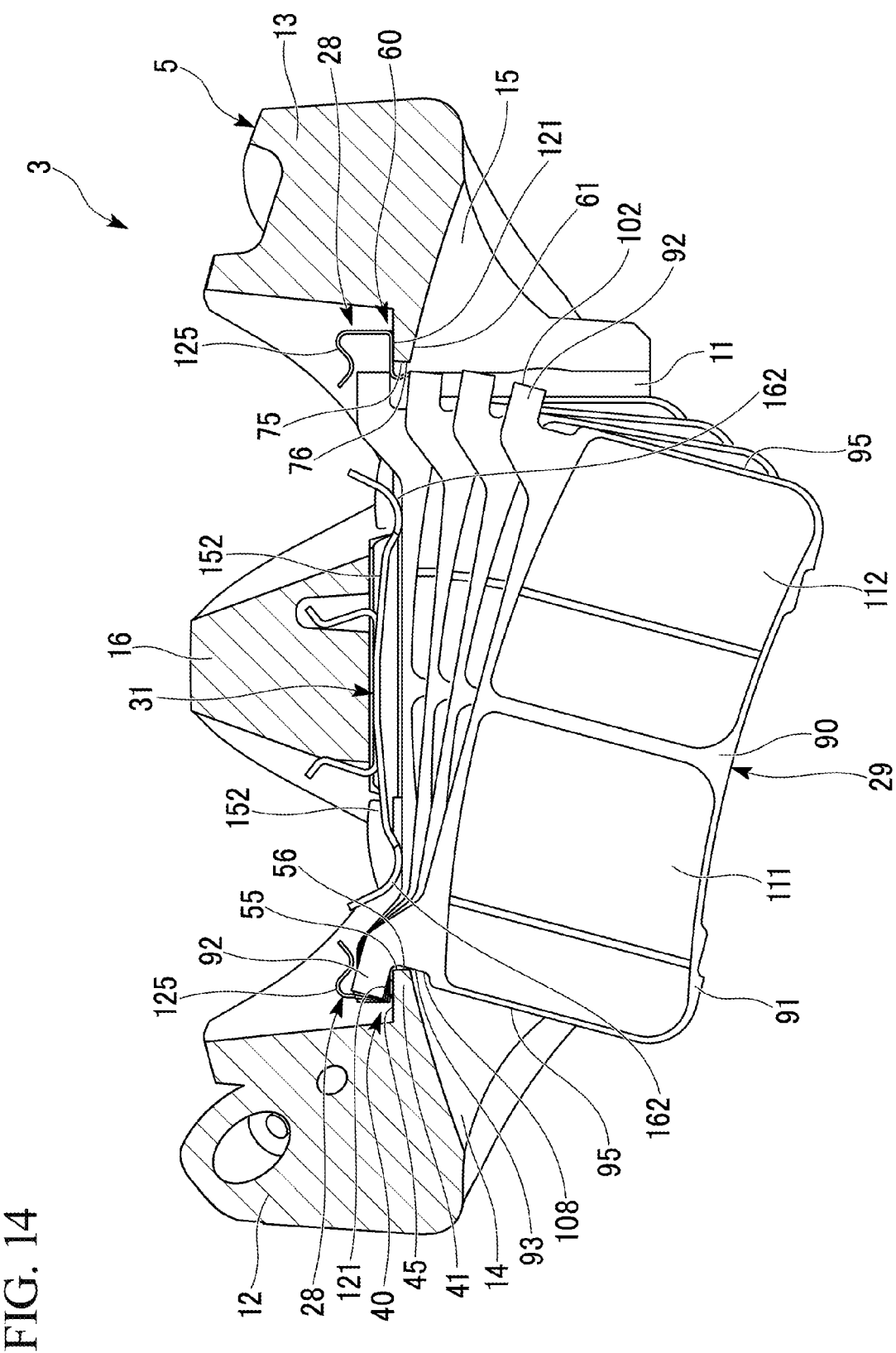
FIG. 14 is a cross-sectional view showing a locus of the brake pad of the disc brake of the first embodiment according to the present invention when the brake pad is assembled.

Here, the caliper 3 shown in FIGS. 1 to 6 as well as FIGS. 7, 8 and 14 used for the following description and the caliper main body 5 shown in FIGS. 9 and 10 are disposed on a left side of the front wheel. In other words, the caliper 3 disposed on the left is disposed on a rear side of the disc rotor 2 of the left side of the front wheel with respect to a longitudinal direction of the vehicle body in such a manner that the cylinder part 10 in which the supply/discharge port 22 and the mounting holes 27 shown in FIG. 1 are formed is disposed on an outer side (left side) in a vehicle width direction, and that one end-side connector part 12 on which the bleeder plug 25 having the passage protrusions 23 and 24 is mounted is disposed on an upper side in a vertical direction. As a result, the end-side connector part 12 is located at an outlet side (hereinafter referred to as a "rotor rotational outlet side") in a rotational direction F of the disc rotor 2 when the vehicle moves forward, and the other end-side connector part 13 is located at an inlet side (hereinafter referred to as a "rotor rotational inlet side") in the rotational direction F of the disc rotor 2 when the vehicle moves forward.

In contrast, although not shown, the caliper disposed on the right is configured such that the caliper main body thereof is formed in mirror symmetry with respect to the caliper main body 5 disposed on the left in the rotor axial direction (vehicle width direction). For this reason, the cylinder part in which the supply/discharge port and the mounting holes are formed is disposed on an outer side (right side) in a vehicle width direction. The caliper disposed on the right is disposed at a rear side of the disc rotor of the right side of the front wheel with respect to the longitudinal direction of the vehicle body in such a manner that one end-side connector part on which the bleeder plug having the passage protrusions is installed is disposed on the upper side in the vertical direction. Therefore, the caliper main body 5 of the caliper 3 disposed on the left is a part that is exclusively used to be disposed on the left, and the caliper main body of the caliper disposed on the right is a part that is exclusively used to be disposed on the right.

As shown in FIGS. 7 and 8, the caliper main body 5 has pad retainers 28 and 28 that are a pair of common parts and are disposed at radial intermediate positions of the end-side connector parts 12 and 13. Brake pads 29 and 29 that are a pair of common parts are supported to the caliper main body 5 via the pad retainers 28 and 28. As shown in FIG. 1, the pair of brake pads 29 and 29 is disposed to face the disc rotor 2. For this reason, one brake pad 29 is disposed between the outer-side cylinder part 10 and the disc rotor 2, and the other brake pad 29 is disposed between the inner-side cylinder part 11 and the disc rotor 2.

When a brake fluid is introduced into the cylinder bores 18 and 19 of the outer-side cylinder part 10 shown in FIG. 2 and the cylinder bores 20 and 21 of the inner-side cylinder part 11 shown in FIG. 4 via the supply/discharge port 22 shown in FIG. 1, the two pistons 6 and 7 provided in the cylinder bores 18 and 19 shown in FIG. 2 and the two pistons 6 and 7 provided in the cylinder bores 20 and 21 shown in FIG. 4 are moved toward the disc rotor 2 by a pressure of the brake fluid. Then, the two pistons 6 and 7 provided for the outer-side cylinder part 10 shown in FIG. 2 press one brake pad 29 installed between the cylinder part 10 and the disc rotor 2 shown in FIG. 1, and push the brake pad 29 against the disc rotor 2. Further, the two pistons 6 and 7 provided for the inner-side cylinder part 11 shown in FIG. 4 press the other brake pad 29 installed between the cylinder part 11 and the disc rotor 2 shown in FIG. 1, and push the brake pad 29 against the disc rotor 2. Thereby, a braking force is generated at the vehicle. In this case, the pair of brake pads 29 and 29 are supported to the caliper main body 5 so as to be restrained from moving in a rotor radial inward direction, and move in the rotor axial direction. Accordingly, the caliper main body 5 supports the pair of brake pads 29 and 29 so as to be pressable toward the disc rotor 2.

As shown in FIG. 1, the aforementioned intermediate connector part 16 of the caliper main body 5 is disposed to extend over the pair of brake pads 29 and 29 in the rotor axial direction along with the disc rotor 2. As shown in FIG. 7, a pad spring 31 is installed between the intermediate connector part 16 and the brake pads 29 and 29 so as to bias the brake pads 29 and 29 to prevent the brake pads from rattling.

As shown in FIG. 8, the intermediate connector part 16 has a ceiling surface 33 formed at an inner side in the rotor radial direction thereof, i.e., at the side of the pad assembling space 17. The ceiling surface 33 is provided with a hole portion 34 recessed outward in the rotor radial direction. The ceiling surface 33 is perpendicular to the radial reference line. The hole portion 34 is formed from the ceiling surface 33 along the radial reference line. The hole portion 34 is formed at a middle position of the ceiling surface 33 in the rotor axial direction so as to be offset to the rotor rotational inlet side, i.e., to the side of the end-side connector part 13, relative to the middle position of the ceiling surface 33 in the rotor rotational direction. In other words, the hole portion 34 is formed in the intermediate connector part 16 so as to be aligned with the disc rotor 2 in the rotor axial direction and be offset to the rotor rotational inlet side with respect to the radial reference line.

Further, as shown in FIG. 1, an end of the intermediate connector part 16 which is located at the rotor rotational outlet side, i.e., at the side of the end-side connector part 12, is provided with a recess 35 recessed toward the rotor rotational inlet side. The recess 35 is formed at a middle position of the pad assembling space 17 in the rotor axial direction so as to be aligned with the disc rotor 2 in the rotor axial direction. The caliper 3 disposed on the left is shown in FIGS. 1 and 8. However, even in the caliper main body of the caliper (not shown) disposed on the right, the ceiling surface of the intermediate connector part which is located at the rotor rotational inlet side has the hole portion formed in the middle thereof in the rotor axial direction, and the end of the intermediate connector part which is located at the rotor rotational outlet side has the recess formed in the middle thereof in the rotor axial direction.

As shown in FIG. 9, the end-side connector part 12 of the caliper main body 5 has a concave wall 38 that is formed at the outer side in the rotor radial direction at the side of the intermediate connector part 16 and is recessed in a direction opposite to the intermediate connector part 16 in the rotor rotational direction. As shown in FIG. 10, the concave wall 38 has a pair of faces 39 and 39 that face each other at both ends in the rotor axial direction thereof at the side of the intermediate connector part 16.

The caliper main body 5 shown in FIGS. 9 and 10 is configured such that, except for the bottoms of the cylinder bores 20 and 21 that are two places of the inner-side cylinder part 11 and are shown in FIG. 4, the cylinder parts 10 and 11, the end-side connector parts 12 and 13, and the intermediate connector part 16 are integrally molded by casting. Inner surfaces of the cylinder bores 18 to 21 indicated in FIGS. 2 and 4 by dotted lines are cut via openings of the bottoms of the cylinder bores 20 and 21 of the two places. Afterwards, a separate blockage member is joined to the openings of the bottoms of the cylinder bores 20 and 21 of the cylinder part 11 by friction stirring joining, thereby blocking the openings to form the bottoms. Thereby, the caliper main body 5 is formed. Alternatively, all of the cylinder parts 10 and 11, the end-side connector parts 12 and 13, and the intermediate connector part 16 may be integrally molded by casting, and the inner surfaces of the cylinder bores 18 to 21 may be cut from the pad assembling space 17 between the cylinder parts 10 and 11.

As shown in FIG. 9, the end-side connector part 12 of the caliper main body 5 is provided with a stepped pad support 40 on the border with the pad assembling space 17. The pad support 40 has an intermediate extension 41 formed at a position of the disc path part 14 in the rotor axial direction, and pad guides 42 and 42 formed at both sides of the intermediate extension 41 in the rotor axial direction. Accordingly, the pad guides 42 and 42 are formed at both sides of the disc path part 14 in the rotor axial direction.

The pad support 40 has a flat pad engaging face 45 that is located at an outer end position thereof in the rotor radial direction and is directed outward in the rotor radial direction. The pad engaging face 45 forms end faces of the intermediate extension 41 and the pad guides 42 and 42 at the outer side in the rotor radial direction. In other words, the outer side of the intermediate extension 41 in the rotor radial direction and the outer side of the pad guides 42 and 42 in the rotor radial direction are the pad engaging face 45 on the same plane located at the outer side in the rotor radial direction relative to the disc path part 14. The pad engaging face 45 is formed such that an extending face thereof is perpendicular to the radial reference line. The pad engaging face 45 is formed of the same member as the whole of the end-side connector part 12, i.e., the caliper main body 5.

The pad guides 42 and 42 are provided with torque receiving faces 46 and 46 facing the pad assembling space 17. The torque receiving faces 46 and 46 are formed parallel to the radial reference line and the rotor axial direction. As shown in FIG. 10, the cylinder parts 10 and 11 are provided with inner surfaces 47 and 47 at positions abutting the pad assembling space 17. The inner surfaces 47 and 47 are formed to be perpendicular to the rotor axial direction. As shown in FIG. 9, escape faces 48 and 48, which are recessed toward the rotor rotational outlet side relative to the torque receiving faces 46 and 46 and to the outer side in the rotor axial direction relative to the inner surfaces 47 and 47, are formed at boundary positions between the inner surfaces 47 and 47 and the torque receiving faces 46 and 46.

The intermediate extension 41 has a caliper-side cutout 55 formed in an end thereof at the side of the pad assembling space 17. The caliper-side cutout 55 is recessed toward the rotor rotational outlet side relative to the torque receiving faces 46 and 46. In other words, the caliper-side cutout 55 opens toward the rotor rotational inlet side (on the middle side of the caliper main body 5 in the rotor rotational direction). A face 56 of the caliper-side cutout 55 which is located at the nearest rotor rotational outlet side is formed parallel to the torque receiving faces 46 and 46, and is located at the rotor rotational outlet side relative to the torque receiving faces 46 and 46. The caliper-side cutout 55 is cut out along with the pad engaging faces 45, and opens outward in the rotor radial direction. Accordingly, the pad engaging face 45 has the caliper-side cutout 55 that is formed at a position of the intermediate extension 41 that matches the disc path part 14 in the rotor axial direction, and that is partly recessed toward the rotor rotational outlet side (i.e. on the outer side of the caliper main body 5 in the rotor rotational direction).

The end-side connector part 13 of the caliper main body 5 has a concave wall 58 that is formed at the outer side in the rotor radial direction at the side of the intermediate connector part 16 and is recessed in a direction opposite to the intermediate connector part 16 in the rotor rotational direction. The concave wall 58 has a pair of faces 59 and 59 that face each other at both ends in the rotor axial direction thereof at the side of the intermediate connector part 16.

Similar to the end-side connector part 12, the end-side connector part 13 of the caliper main body 5 which is located at the rotor rotational inlet side is provided with a stepped pad support 60 on the border with the pad assembling space 17. The pad support 60 has an intermediate extension 61 formed at a position of the disc path part 15 in the rotor axial direction, and pad guides 62 and 62 formed at both sides of the intermediate extension 61 in the rotor axial direction. Accordingly, the pad guides 62 and 62 are formed at both sides of the disc path part 15 in the rotor axial direction.

The pad support 60 has a flat pad engaging face 65 that is located at an outer end position thereof in the rotor radial direction and is directed outward in the rotor radial direction. The pad engaging face 65 forms end faces of the intermediate extension 61 and the pad guides 62 and 62 at the outer side in the rotor radial direction. In other words, the outer side of the intermediate extension 61 in the rotor radial direction and the outer side of the pad guides 62 and 62 in the rotor radial direction are the pad engaging face 65 on the same plane located at the outer side in the rotor radial direction relative to the disc path part 15. The pad engaging face 65 is formed such that an extending face thereof is perpendicular to the radial reference line and is disposed on the same plane as the pad engaging face 45. The pad engaging face 65 is formed of the same member as the whole of the end-side connector part 13, i.e., the caliper main body 5.

The pad guides 62 and 62 are provided with torque receiving faces 66 and 66 facing the pad assembling space 17. The torque receiving faces 66 and 66 are formed parallel to the radial reference line and the rotor axial direction. The torque receiving faces 66 and 66 are aligned with the torque receiving faces 46 and 46 in the rotor axial direction and the rotor radial direction. As shown in FIG. 9, the cylinder parts 10 and 11 have escape faces 68 and 68 that are formed at boundary positions between the inner surfaces 47 and 47 and the torque receiving faces 66 and 66 and that are recessed toward the rotor rotational inlet side relative to the torque receiving faces 66 and 66 and toward the outer side in the rotor axial direction relative to the inner surfaces 47 and 47.

The intermediate extension 61 has a caliper-side cutout 75 formed in an end thereof at the side of the pad assembling space 17. The caliper-side cutout 75 is recessed toward the rotor rotational inlet side relative to the torque receiving faces 66 and 66. In other words, the caliper-side cutout 75 opens toward the rotor rotational outlet side (the middle side of the caliper main body 5 in the rotor rotational direction). A face 76 of the caliper-side cutout 75 which is located at the nearest rotor rotational inlet side is formed parallel to the torque receiving faces 66 and 66, and is located at the rotor rotational inlet side relative to the torque receiving faces 66 and 66. The caliper-side cutout 75 is cut out along with the pad engaging face 65, and is open outward in the rotor radial direction. Accordingly, the pad engaging face 65 has the caliper-side cutout 75 that is formed at a position of the intermediate extension 61 that matches the disc path part 15 in the rotor axial direction, and that is partly recessed toward the rotor rotational inlet side (i.e. on the outer side of the caliper main body 5 in the rotor rotational direction).

Figure 11:
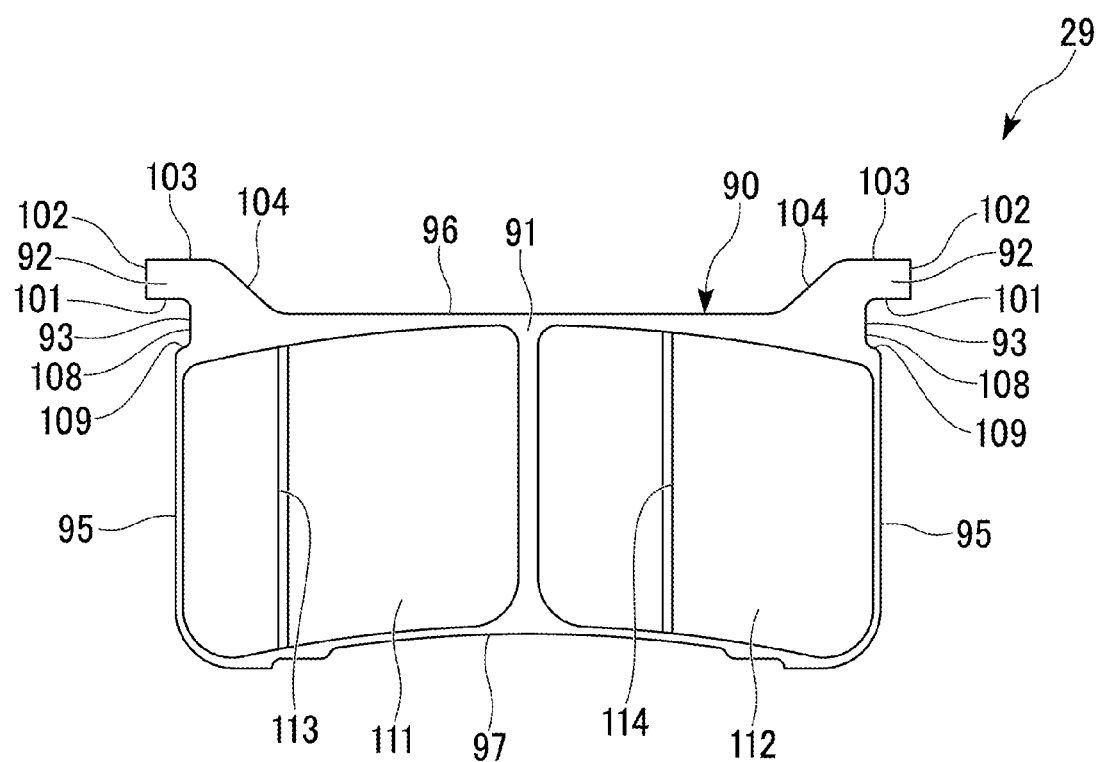
FIG. 11 is a front view showing a brake pad of the disc brake of the first embodiment according to the present invention.
Figure 12A:
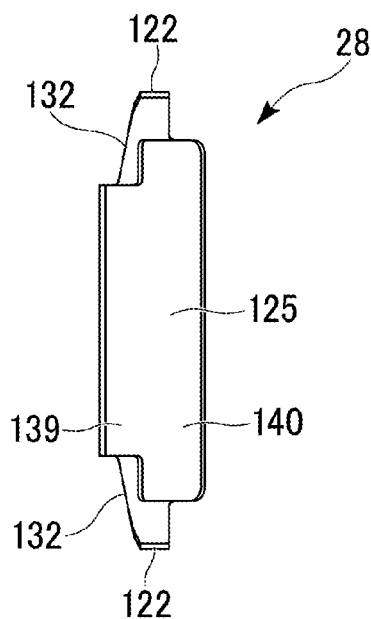
FIG. 12A is a plan view showing a pad retainer of the disc brake of the first embodiment according to the present invention.
Figure 12B:
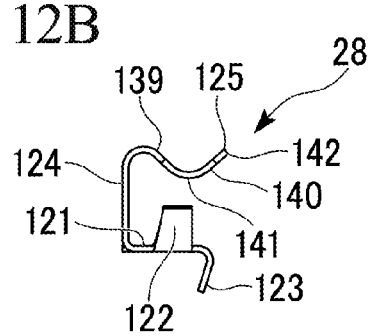
FIG. 12B is a side view showing the pad retainer of the disc brake of the first embodiment according to the present invention.
Figure 12C:
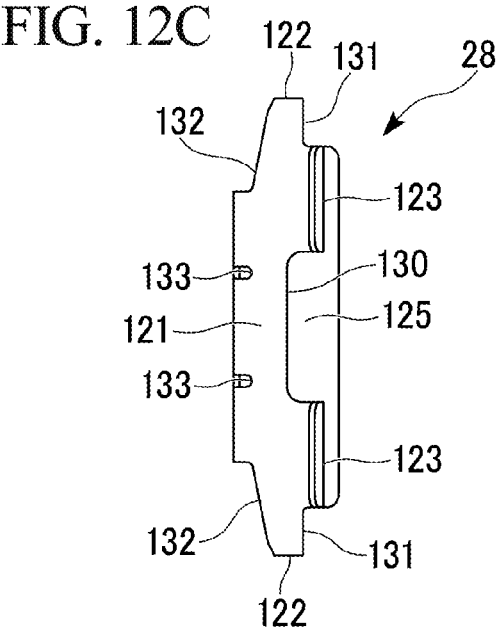
FIG. 12C is a bottom view showing the pad retainer of the disc brake of the first embodiment according to the present invention.
Figure 12D:
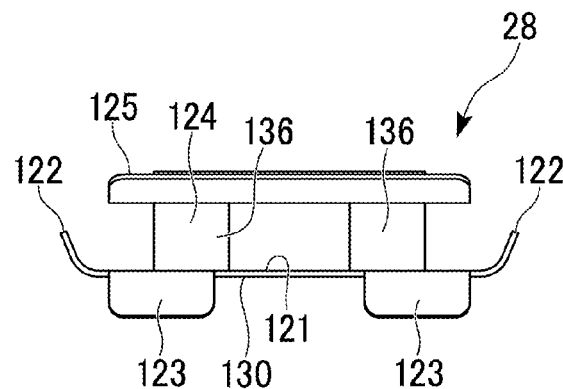
FIG. 12D is a front view showing the pad retainer of the disc brake of the first embodiment according to the present invention.
Figure 12E:
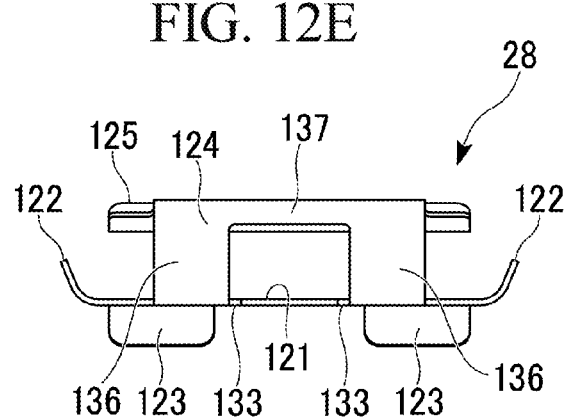
FIG. 12E is a rear view showing the pad retainer of the disc brake of the first embodiment according to the present invention.

As shown in FIG. 11, the brake pad 29 has a liner 90 formed in mirror symmetry with respect to the center in a longitudinal direction thereof. The liner 90 has a constant plate thickness, and has a main plate 91 and a pair of protrusion segments 92 and 92. The main plate 91 has an approximately rectangular shape, and the pair of protrusion segments 92 and 92 protrude from both ends of the main plate 91, which are located in a longitudinal direction (a leftward/rightward direction of FIG. 11) of one side of a height direction (an upward/downward direction of FIG. 11, or a direction directed from the center of the disc rotor 2 toward the rotor circumferential center of the brake pad 29) of the main plate 91, to an outer side in the height direction, and then protrude to an outer side in the longitudinal direction. The liner 90 has a pair of pad-side cutouts 93 and 93 that are formed at boundary positions between both ends in the longitudinal direction of the main plate 91 and the pair of protrusion segments 92 and 92 and are recessed toward the middle side in the longitudinal direction.

As shown in FIG. 8, in a state in which the pair of protrusion segments 92 and 92 is disposed at an outer end side in the rotor radial direction, the brake pad 29 is supported on the pad supports 40 and 60 of the caliper main body 5 at the protrusion segments 92 and 92. The brake pad 29 has the protrusion segments 92 and 92 that are formed at positions corresponding to the outer end side in the rotor radial direction and protrude in a direction separated from the middle portion of the brake pad 29 in the rotor rotational direction. Further, the brake pad 29 has the pair of pad-side cutouts 93 and 93 that are formed at the inner side in the rotor radial direction relative to the pair of protrusion segments 92 and 92 and are recessed toward the middle side of the brake pad 29 in the rotor rotational direction.

As shown in FIG. 11, the main plate 91 has a pair of faces 95 and 95, a face (perpendicular face) 96, and a face 97.

The pair of faces 95 and 95 is located at both end positions of the main plate 91 in the longitudinal direction of the main plate 91, is formed parallel to each other, and is perpendicular to the longitudinal direction of the main plate 91. The face 96 is located at an end position of the main plate 91 which is located at the side of the protrusion segments 92 and 92 in the height direction of the main plate 91, and is perpendicular to the height direction of the main plate 91. Accordingly, the face 96 runs in a direction perpendicular to the pair of faces 95 and 95. The face 97 is located at an end position of the main plate 91 which is located at a side opposite to the pair of protrusion segments 92 and 92 in the height direction of the main plate 91, extends in a direction perpendicular to the height direction of the liner 90 as a whole, and has a stepped shape so as to reduce the distance from the face 96 with the approach to the middle side of the main plate 91 in the longitudinal direction of the main plate 91.

The pair of protrusion segments 92 and 92 each have a face 101, a face 102, a face 103, and a face (inclined face) 104.

The faces 101 and 101 are located at the side of the main plate 91 of the protrusion segments 92 and 92 in the height direction of the main plate 91. Both of the faces 101 and 101 are disposed on the same plane toward the main plate 91, and are formed perpendicular to the height direction of the main plate 91, i.e., parallel to the longitudinal direction. Accordingly, the faces 101 and 101 are formed parallel to the face 96 of the main plate 91, and run in a direction perpendicular to the faces 95 and 95 of the main plate 91.

The faces 102 and 102 extend from end edges of the faces 101 and 101, which are located at a side opposite to the main plate 91 in the longitudinal direction of the main plate 91, so as to be separated from the main plate 91 in the height direction of the main plate 91. The faces 102 and 102 are located at both end positions of the pair of protrusion segments 92 and 92 in the longitudinal direction of the main plate 91, are directed outward in the longitudinal direction of the main plate 91, and are perpendicular to the longitudinal direction of the main plate 91. The faces 102 and 102 are formed parallel to the faces 95 and 95.

The faces 103 and 103 extend from end edges of the faces 102 and 102, which are located at a side opposite to the faces 101 and 101, toward the middle side of the main plate 91 in the longitudinal direction of the main plate 91. The faces 103 and 103 are located at end positions of the protrusion segments 92 and 92 which are located at a side opposite to the main plate 91 in the height direction of the main plate 91, and are directed to the side opposite to the main plate 91 in the height direction of the main plate 91. The faces 103 and 103 are disposed on the same plane, are perpendicular to the height direction of the main plate 91, and are formed parallel to the faces 101 and 101.

Both of the faces 104 and 104 connect the face 103 and the face 96 that are located at the same side in the longitudinal direction of the main plate 91, are substantially directed outward in the height direction of the main plate 91, and run in a thickness direction of the liner 90. When the faces 104 and 104 approach the face 96 in the longitudinal direction of the main plate 91, the faces 104 and 104 are inclined to approach the face 96 in the height direction of the main plate 91.

The pair of pad-side cutouts 93 and 93 is each made up of the aforementioned face 101, a face 108, and a face 109.

Each of the faces 108 and 108 extends from an end edge of the middle side of the neighboring face 101 in the longitudinal direction of the main plate 91 toward the main plate 91 in the height direction of the main plate 91. The faces 108 and 108 are formed to be directed outward in the longitudinal direction of the main plate 91 and to be perpendicular to the longitudinal direction of the main plate 91. Accordingly, the faces 108 and 108 are perpendicular to the faces 101 and 101, and are formed parallel to the faces 95 and 95 and the faces 102 and 102.

Each of the faces 109 and 109 extends from an end edge of the face 108 located at the same side in the longitudinal direction of the main plate 91 to the outer side of the main plate 91 in the longitudinal direction of the main plate 91, wherein the end edge of the face 108 is located at a side opposite to the face 101. Each of the faces 109 and 109 is connected to the face 95 of the main plate 91. The faces 109 and 109 are substantially directed outward in the height direction of the main plate 91, and are inclined with the approach to outer sides thereof in the longitudinal direction of the main plate 91 so as to be separated from the protrusion segments 92 and 92 in the height direction of the main plate 91.

The brake pad 29 is formed by adhering friction materials 111 and 112 to two places separated on one surface in the thickness direction of the liner 90 in the longitudinal direction of the liner 90. As shown in FIG. 11, when the brake pad 29 is viewed from the side of the friction materials 111 and 112 with the protrusion segments 92 and 92 of the liner 90 set to an upper side, the friction material 111 is provided with a groove 113 offset to the left side with respect to the center thereof, and the friction material 112 is also provided with a groove 114 offset to the left side with respect to the center thereof. Further, the grooves 113 and 114 are formed by cutting work after the adhesion of the friction materials 111 and 112 to the liner 90.

As shown in FIG. 8, the brake pad 29 slides in the rotor axial direction by the faces 95 and 95 being guided by the torque receiving faces 46 and 66 of the caliper main body 5. Accordingly, an interval between the faces 95 and 95 is narrower than that between the torque receiving faces 46 and 66 by a predetermined gap in which the brake pad is slidable in the rotor axial direction.

Here, a relation between the caliper main body 5 and the brake pad 29 will be described with reference to FIGS. 10 and 11. In the brake pad 29, the distance between the face 102 of the protrusion segment 92 at one side in the longitudinal direction of the liner 90 and the face 108 of the pad-side cutout 93 at the other side in the longitudinal direction of the liner 90, i.e., the distance between the face 108 of the pad-side cutout 93 at one side in the longitudinal direction of the liner 90 and the face 102 of the protrusion segment 92 at the other side in the longitudinal direction of the liner 90, is shorter than that between the faces 56 and 76 of the caliper-side cutouts 55 and 75.

Accordingly, the brake pad 29 is formed with such dimensions that, when one pad-side cutout 93 comes into contact with the face 56 that is an inner region in the rotor radial direction relative to the pad engaging face 45 of the end-side connector part 12 of the caliper main body 5 and that is aligned with the disc path part 14 in the rotor axial direction, the middle position thereof in the rotor rotational direction is offset toward the face 56, which is a contact position, relative to the center between the intermediate extensions 41 and 61, i.e., the center between the pad guides 42 and 62, in the rotor rotational direction. Further, the brake pad 29 is formed with such dimensions that, when the other pad-side cutouts 93 come into contact with the face 76 that is an inner region in the rotor radial direction relative to the pad engaging face 65 of the end-side connector part 13 of the caliper main body 5 and that is aligned with the disc path part 15 in the rotor axial direction, the middle position thereof in the rotor rotational direction is offset toward the face 76, which is a contact position, relative to the center between the intermediate extensions 41 and 61, i.e., the center between the pad guides 42 and 62, in the rotor rotational direction.

In other words, the caliper main body 5 is formed with such dimensions that, when the face 56 of the caliper-side cutout 55 comes into contact with the face 108 of the brake pad 29 which is an inner region in the rotor radial direction relative to the protrusion segment 92 of the brake pad 29, the middle position of the brake pad 29 in the rotor rotational direction is offset toward the face 56, which is a contact position, relative to the center between the intermediate extensions 41 and 61, i.e., the center between the pad guides 42 and 62, in the rotor rotational direction. Further, the caliper main body 5 is formed with such dimensions that, when the face 76 of the caliper-side cutout 75 comes into contact with the face 108 of the brake pad 29 which is an inner region in the rotor radial direction relative to the protrusion segment 92 of the brake pad 29, the middle position of the brake pad 29 in the rotor rotational direction is offset toward the face 76, which is a contact position, relative to the center between the intermediate extensions 41 and 61, i.e., the center between the pad guides 42 and 62, in the rotor rotational direction.

In the brake pad 29, a distance A (see FIG. 11) between the faces 102 and 102 located at one side in the longitudinal direction of the liner 90 is longer than a distance between the torque receiving faces 46 and 66. In other words, the maximum length of the brake pad 29 is longer than the distance between the torque receiving faces 46 and 66. Further, the distance A is longer than the distance between the pad engaging face 45 located at the pad guide 42 and the pad engaging face 65 located at the pad guide 62. Furthermore, the distance A is longer than the distance between the faces 56 and 76 of the caliper-side cutouts 55 and 75. Further, the distance A is greater than the distance between the pad engaging face 45 located at the intermediate extension 41 and the pad engaging face 65 located at the intermediate extension 61.

In the brake pads 29, when the faces 95 and 95 are interposed between the torque receiving faces 46 and 66, one face 101 is aligned with the pad engaging face 45 located at the pad guide 42 in the rotor rotational direction, and faces the pad engaging face 45 in the rotor radial direction. Further, the other face 101 is aligned with the pad engaging face 65 located at the pad guide 62 in the rotor rotational direction, and faces the pad engaging face 65 in the rotor radial direction. In other words, the pair of end-side connector parts 12 and 13 of the caliper main body 5 are provided with the pad engaging faces 45 and 65 on which the faces 101 and 101, which are the inner regions of the protrusion segments 92 and 92 of the brake pad 29 in the rotor radial direction, are disposed to be opposite to each other at the same time.

As shown in FIG. 12, the pad retainer 28 is formed in mirror symmetry with respect to the center in a longitudinal direction thereof. The pad retainer 28 is stamped, folded, and formed of a plate having a constant thickness by pressing. The pad retainer 28 has a mounting plate portion 121, a pair of engaging plate portions 122 and 122, a pair of contact plate portions 123 and 123, a standing plate portion 124, and a cover plate portion 125.

A longitudinal direction of the mounting plate portion 121 is a longitudinal direction (width direction) of the pad retainer 28. The mounting plate portion 121 is provided with a center recess 130 recessed from one edge in a depth direction thereof within a predetermined range of the middle in the longitudinal direction thereof. Further, the mounting plate portion 121 is provided with cutouts 131 and 131 that are formed at the side of the center recess 130 in the depth direction thereof within a predetermined range of both ends in the longitudinal direction thereof and are recessed from one edge in the depth direction thereof. Further, the mounting plate portion 121 is provided with cutouts 132 and 132 that are formed at a side opposite to the center recess 130 in the depth direction thereof within a predetermined range of both ends in the longitudinal direction thereof and are inclined to reduce a length in the depth direction thereof with the approach to end sides thereof in the longitudinal direction thereof. Further, the mounting plate portion 121 is provided with recesses 133 and 133 that are formed at a position between the cutouts 132 and 132 in the longitudinal direction thereof and are recessed from an edge thereof at the side opposite to the middle recess 130.

The pair of engaging plate portions 122 and 122 extends from both ends in the longitudinal direction of the mounting plate portion 121 to the same side in a thickness direction of the mounting plate portion 121. The engaging plate portions 122 and 122 slantly extend to be located outside in the longitudinal direction of the mounting plate portion 121 in proportion as they are separated from the mounting plate portion 121 in the thickness direction of the mounting plate portion 121.

The pair of contact plate portions 123 and 123 are one edge of the mounting plate portion 121 which is located at the side of the center recess 130 in the depth direction of the mounting plate portion 121, and are formed at positions between the center recess 130 and the cutouts 131 and 131 in the longitudinal direction of the mounting plate portion 121. The pair of contact plate portions 123 and 123 slantly extend from the mounting plate portion 121 to a side opposite to the engaging plate portions 122 and 122 in the thickness direction of the mounting plate portion 121 with the approach to extension tip sides thereof so as to be located at a middle side of the mounting plate portion 121 in the depth direction of the mounting plate portion 121.

The standing plate portion 124 has a pair of leg plate portions 136 and 136 that extend from the other edge of the mounting plate portion 121, which is located at the side opposite to the center recess 130 in the depth direction of the mounting plate portion 121, to the same side as the engaging plate portions 122 and 122 in the thickness direction of the mounting plate portion 121 at a right angle to the mounting plate portion 121, and a connecting plate portion 137 that connects the leg plate portions 136 and 136 at the side opposite to the mounting plate portion 121.

The cover plate portion 125 extends from an end edge of the standing plate portion 124 which is located at the side opposite to the mounting plate portion 121 to the same side as the mounting plate portion 121 in the depth direction of the mounting plate portion 121. The cover plate portion 125 is configured such that a side of the standing plate portion 124 is a proximal-end plate portion 139 that has the same length as the standing plate portion 124, and such that a side opposite to the standing plate portion 124 is a distal-end plate portion 140 that is longer than the proximal-end plate portion 139 at both sides in the longitudinal direction thereof. The proximal-end plate portion 139 is configured such that a portion thereof abutting the standing plate portion 124 has the shape of a curved plate whose center is located at the side of the mounting plate portion 121, and such that its side opposite to the standing plate portion 124 is inclined with the approach to a tip side thereof so as to come close to the mounting plate portion 121. The distal-end plate portion 140 is configured such that a side of the proximal-end plate portion 139 is a curved plate portion 141 whose center is located at the side opposite to the mounting plate portion 121, and such that a side opposite to the proximal-end plate portion 139 becomes an inclined plate portion 142 that is inclined with the approach to a tip side thereof so as to be separated from the mounting plate portion 121 in the thickness direction of the mounting plate portion 121, and that has a flat plate shape.

As shown in FIG. 1, the pair of pad retainers 28 and 28 are mounted on the pad supports 40 and 60 of the caliper main body 5. In detail, one pad retainer 28 is configured such that the engaging plate portions 122 and 122 thereof are engaged with the pair of faces 39 and 39 of the concave wall 38 of the end-side connector part 12, that the mounting plate portion 121 thereof is in contact with the pad engaging face 45 of the pad support 40 as shown in FIG. 8, and that the contact plate portions 123 and 123 thereof are in contact with the torque receiving faces 46 and 46 of the pad support 40. Then, in the pad retainer 28, the center recess 130 shown in FIG. 12 is aligned with the caliper-side cutout 55 of the pad support 40 shown in FIG. 10 in the rotor axial direction. Further, in this case, the center recess 130 is further recessed to the side opposite to the intermediate connector part 16 than the face 56 of the caliper-side cutout 55 in the rotor rotational direction.

Similarly, as shown in FIG. 1, the other pad retainer 28 is configured such that the engaging plate portions 122 and 122 thereof are engaged with the pair of faces 59 and 59 of the concave wall 58 of the end-side connector part 13, that the mounting plate portion 121 thereof is in contact with the pad engaging face 65 of the pad support 60 as shown in FIG. 8, and that the contact plate portions 123 and 123 thereof are in contact with the torque receiving faces 66 and 66 of the pad support 60. Then, in the pad retainer 28, the center recess 130 shown in FIG. 12 is aligned with the caliper-side cutout 75 of the pad support 60 shown in FIG. 10 in the rotor axial direction. Further, in this case, the center recess 130 is further recessed to the side opposite to the intermediate connector part 16 than the face 76 of the caliper-side cutout 75 in the rotor rotational direction.

As shown in FIG. 8, the pair of brake pads 29 and 29 is supported on the caliper main body 5 via the pad retainers 28 and 28 that have been installed on the pad supports 40 and 60 of the caliper main body 5. When disposed on this caliper main body 5, the pair of brake pads 29 and 29 is each configured such that the faces 95 and 95 of both sides of the main plate 91 are opposite to the torque receiving faces 46 and 66 in the rotor rotational direction with positions thereof overlapping in the rotor axial and radial directions. In this state, one protrusion segment 92 is inserted between the mounting plate portion 121 and the cover plate portion 125 of the pad retainer 28 disposed on the pad support 40, and the other protrusion segment 92 is inserted between the mounting plate portion 121 and the cover plate portion 125 of the pad retainer 28 disposed on the pad support 60.

In this case, in each of the brake pads 29 and 29, the protrusion segments 92 and 92 are configured such that the faces 101 and 101 thereof are in contact with the mounting plate portions 121 and 121 of the pad retainer 28, and the faces 103 and 103 thereof are opposite to the cover plate portions 125 and 125. Further, in this case, the faces 102 and 102 of the protrusion segments 92 and 92 are separated from both of the standing plate portions 124 and 124 of the pad retainers 28 and 28 at an interval. Furthermore, in this case, each of the brake pads 29 and 29 causes the faces 108 and 108 to be separated from the contact plate portions 123 and 123. In this way, positions of the brake pads 29 and 29 in the rotor radial and rotational directions are defined relative to the caliper main body 5. The pad guides 42 and 62 located at one side of the caliper main body 5 in the rotor axial direction support one brake pad 29 via the mounting plate portions 121 and 121 of the pad retainers 28 and 28. Further, the pad guides 42 and 62 located at the other side of the caliper main body 5 in the rotor axial direction support the other brake pad 29 via the mounting plate portions 121 and 121 of the pad retainers 28 and 28.

The brake pads 29 and 29, whose positions in the rotor radial and rotational directions are defined relative to the caliper main body 5 are configured such that the central lines thereof are consistent with each other. These central lines pass through the center of the caliper main body 5 in the rotor rotational direction. Accordingly, in other words, the aforementioned radial reference line passing through the center of the caliper main body 5 in the rotor rotational direction passes through the centers of the brake pads 29 and 29 and the center of the disc rotor 2, and runs in the rotor radial direction. Each of the brake pads 29 and 29 is formed such that the face 96 thereof is perpendicular to the radial reference line connecting the center of the brake pad 29 and the center of the disc rotor 2 and such that the faces 104 and 104 thereof intersect each other with respect to rotor rotational outlet and inlet directions of the brake pad 29, and are inclined with respect to the face 96.

As shown in FIG. 13, the pad spring 31 is formed in rotational symmetry such that a shape thereof is the same when rotated 180°. In detail, the pad spring 31 is formed in mirror symmetry with respect to the middle in a longitudinal direction (width direction) thereof, and is formed in mirror symmetry with respect to the middle in a depth direction thereof. The pad spring 31 is stamped, folded, and formed of a plate having a constant thickness by pressing. As such, the pad spring 31 has a base plate portion 150, a pair of claw portions 151 and 151, and two pairs, i.e., four, biasing segments 152, 152, 152 and 152.

The base plate portion 150 has a flat plate shape. The base plate portion 150 has a middle plate portion 153 that is long in one direction thereof, a pair of protrusion plate portions 154 and 154 that protrude from the middle in a longitudinal direction of the middle plate portion 153 to both sides in a depth direction of the middle plate portion 153, and a pair of lateral plate portions 155 and 155 that are formed to extend to both sides in the longitudinal direction of the middle plate portion 153 at sides of the protrusion plate portions 154 and 154 which are sides opposite to the middle plate portion 153. The pair of lateral plate portions 155 and 155 has a long shape in the same direction as the middle plate portion 153.

The claw portions 151 and 151 extend from both ends in the longitudinal direction of the middle plate portion 153 of the base plate portion 150 to the same side as a thickness direction of the base plate portion 150, and are opposite to each other. Each of the claw portions 151 and 151 has a proximal-end plate portion 156 at a side of the base plate portion 150, and a distal-end plate portion 157 at a side opposite to the base plate portion 150. The proximal-end plate portion 156 is inclined with the approach to a tip side thereof so as to approach a middle side of the middle plate portion 153 in the longitudinal direction of the middle plate portion 153. The distal-end plate portion 157 is inclined with the approach to a tip side thereof so as to be located at a side opposite to the middle of the middle plate portion 153 in the longitudinal direction of the middle plate portion 153.

Among the four biasing segments 152, 152, 152 and 152, one pair of biasing segments 152 and 152 in a depth direction extend from one lateral plate portion 155 of the base plate portion 150 to both sides in the longitudinal direction of one lateral plate portion 155. Further, the other pair of biasing segments 152 and 152 extends from the other lateral plate portion 155 of the base plate portion 150 to both sides in the longitudinal direction of the other lateral plate portion 155. The extending direction of the biasing segments 152, 152, 152 and 152 is the longitudinal direction of the pad spring 31. A direction connecting one pair of biasing segments 152 and 152 and the other pair of biasing segments 152 and 152 is the depth direction of the pad spring 31.

One pair of biasing segments 152 and 152 are provided to extend to both sides in the longitudinal direction of the pad spring 31 relative to the pair of claw portions 151 and 151, and the other pair of biasing segments 152 and 152 are also provided to extend to both sides in the longitudinal direction of the pad spring 31 relative to the pair of claw portions 151 and 151.

Each of the biasing segments 152, 152, 152 and 152 has an arm plate portion 161 that extends from the lateral plate portion 155 of the base plate portion 150 in the longitudinal direction of the pad spring 31, and a pressing plate portion 162 that is located at a side of the arm plate portion 161 which is a side opposite to the lateral plate portion 155 and that is widened to both sides in the depth direction of the pad spring 31 than the arm plate portion 161.

The arm plate portion 161 slantly extends with the approach to a tip side thereof so as to be located at a side opposite to the claw portion 151 in the thickness direction of the base plate portion 150. The pressing plate portion 162 is configured such that a side thereof which is a side of the arm plate portion 161 is a curved plate portion 163 having a curved plate shape whose center is located at a side of the claw portion 151 in a thickness direction of the arm plate portion 161. Further, the pressing plate portion 162 is configured such that its side opposite to the arm plate portion 161 is a distal-end plate portion 164 inclined with the approach to an extension tip side thereof so as to be located at the side of the claw portion 151 in the thickness direction of the arm plate portion 161 and at an outer side in the longitudinal direction of the pad spring 31. The curved plate portion 163 protrudes to the side opposite to the claw portion 151 in the thickness direction of the arm plate portion 161 relative to an extension face of the arm plate portion 161 which is located in a direction opposite to the lateral plate portion 155.

As shown in FIG. 8, the pad spring 31 is engaged with the intermediate connector part 16 by the pair of claw portions 151 and 151 facing each other, and is installed on the caliper main body 5. In detail, one claw portion 151 is inserted into the hole portion 34 at the rotor rotational inlet side of the intermediate connector part 16, and the other claw portion 151 is disposed in the recess 35 at the rotor rotational outlet side. Thereby, the pair of claw portions 151 and 151 facing each other come into contact with a wall of the hole portion 34 of the intermediate connector part 16 which is a wall located at a side of the recess 35, and with a wall of the recess 35 which is located at a side of the hole portion 34, and are sandwiched between these walls. In this way, the pad spring 31 is installed on the caliper main body 5. A central position between the wall of the hole portion 34 which is located at the side of the recess 35 and the wall of the recess 35 which is located at the side of the hole portion 34 with which the pair of claw portions 151 and 151 are engaged is offset in the rotor rotational direction with respect to the middle in the rotor rotational direction of the caliper main body 5, and more particularly is offset to the rotor rotational outlet side.

As described above, the pad spring 31 in a state in which the pair of claw portions 151 and 151 are engaged with the intermediate connector part 16 is in a state in which the pair of biasing segments 152 and 152 located at one side in the rotor axial direction extend to both sides in the rotor rotational direction relative to the pair of claw portions 151 and 151, and in which the pair of biasing segments 152 and 152 of the other side in the rotor axial direction also extend to both sides in the rotor rotational direction relative to the pair of claw portions 151 and 151.

Further, since the center of an engaging position of the pair of claw portions 151 and 151 is offset in the rotor rotational direction with respect to the middle in the rotor rotational direction of the caliper main body 5, the pad spring 31 in a state in which the pair of claw portions 151 and 151 are engaged with the intermediate connector part 16 is in a state in which the center in the longitudinal direction thereof is offset in the rotor rotational direction with respect to the middle in the rotor rotational direction of the caliper main body 5. In other words, in the state in which the center in the longitudinal direction of the pad spring 31 is offset in the rotor rotational direction with respect to the middle in the rotor rotational direction of the brake pads 29 and 29, the pair of claw portions 151 and 151 are engaged with the intermediate connector part 16. Further, in the state in which the pair of claw portions 151 and 151 are engaged with the intermediate connector part 16, the pad spring 31 is configured such that a position thereof is defined relative to the caliper main body 5, and such that positions thereof in rotor radial and rotational directions are defined relative to the brake pads 29 and 29 whose positions in rotor radial and rotational directions are defined relative to the caliper main body 5.

The pad spring 31 has a rotationally symmetrical shape that is the same when rotated 180°. For this reason, as shown in FIG. 8, when the pad spring 31 is installed on the caliper main body 5, the longitudinal direction thereof is made to run in the rotor rotational direction. Thus, it is unnecessary to consider front and rear directions in the rotor rotational direction. Further, when the pair of claw portions 151 and 151 are disposed between the hole portion 34 and the side of the intermediate connector part 16 which is the side opposite to the recess 35, an interval between the pair of claw portions 151 and 151 is wider than that between the hole portion 34 and the side of the intermediate connector part 16, and thus the pad spring 31 falls off without being assembled to the intermediate connector part 16. Thereby, such improper assembly is prevented. Furthermore, since the pad spring 31 has the mirror-symmetrical shape in both of the longitudinal direction (rotor rotational direction) and the depth direction (rotor axial direction), the pad spring 31 is also used as a common part in the caliper disposed on the right which has the mirror-symmetrical shape in the vehicle width direction, with regard to the aforementioned caliper 3 disposed on the left. Even when the pad spring 31 is used for the caliper disposed on the right, it is unnecessary to consider front and rear directions in the rotor rotational direction.

The pad spring 31 whose positions in the rotor radial and rotational directions are defined with respect to the brake pads 29 and 29 and which is installed on the caliper main body 5 is configured such that the biasing segments 152 and 152 located at the rotor rotational inlet side come into contact with the faces 96 and 96 of the liners 90 and 90 of the brake pads 29 and 29 at the curved plate portions 163 and 163 of the pressing plate portions 162 and 162, are elastically deformed toward the outer side in the rotor radial direction, and cause the faces 96 and 96 to be biased inward in the rotor radial direction. Further, the pad spring 31 is configured such that the biasing segments 152 and 152 located at the rotor rotational outlet side come into contact with the faces 104 and 104 of the rotor rotational outlet side of the liners 90 and 90 of the brake pads 29 and 29 at the curved plate portions 163 and 163 of the pressing plate portions 162 and 162, are elastically deformed to the outer side in the rotor radial direction, and cause the faces 104 and 104 to be biased in the rotor rotational outlet direction and inward in the rotor radial direction by inclinations of the faces 104 and 104.

In other words, the pressing plate portions 162 and 162 of the biasing segments 152 and 152 of the rotor rotational outlet side of the pad spring 31 constitute rotor-radial-direction biasing portions that bias the faces 96 and 96 perpendicular to the radial reference line that connects the centers in the rotor rotational direction of the brake pads 29 and 29 and the center of the disc rotor 2, and rotor-rotational-outlet-direction biasing portions that bias the faces 104 and 104, i.e., inclined faces, that intersect each other with respect to the rotor rotational outlet direction of the brake pads 29 and 29 and are formed to be inclined with respect to the faces 96 and 96.

Thus, the pad spring 31 whose positions in the rotor radial and rotational directions are defined with respect to the brake pads 29 and 29 and which is installed on the caliper main body 5 is configured such that, when the biasing segments 152 and 152, which extend to one side (rotational inlet side) in the rotor rotational direction relative to the pair of claw portions 151 and 151, among the biasing segments 152, 152, 152 and 152 are brought into contact with the faces 96 and 96 of the brake pads 29 and 29 by the pressing plate portions 162 and 162, the biasing segments 152 and 152, which extend to the other side (rotational outlet side) in the rotor rotational direction relative to the pair of claw portions 151 and 151, among the biasing segments 152, 152, 152 and 152 are brought into contact with the faces 104 and 104 of the brake pads 29 and 29 by the pressing plate portions 162 and 162. Further, two hole portions may be formed in the intermediate connector part 16 in the rotor rotational direction such that middle positions thereof in the rotor rotational direction are offset from each other in the rotor rotational direction (rotational outlet side) with respect to the middle position in the rotor rotational direction of the brake pads 29 and 29, and the pair of claw portions 151 and 151 of the pad spring 31 may be adapted to be inserted into these hole portions.

Next, an example of a process of installing the pair of brake pads 29 and 29 on the caliper 3 will be described. Here, the installation of the brake pad 29 disposed on the side of the cylinder part 11 will be described mainly with reference to FIGS. 8 and 14.

As shown in FIG. 14, the pad retainers 28 and 28 as described above are installed on the pad supports 40 and 60 of the caliper main body 5, and the pad spring 31 as described above is installed on the intermediate connector part 16 of the caliper main body 5.

In this state, the brake pad 29 is adapted to assume such a posture that the protrusion segments 92 and 92 are disposed at an outer side in the rotor radial direction and that the liner 90 is directed to the cylinder part 11 in the rotor axial direction. The brake pad 29 having such a posture is shifted from the inner side to the outer side in the rotor radial direction by aligning a position in the rotor axial direction with positions of the disc path parts 14 and 15.

In this case, the brake pad 29 is inclined so that one protrusion segment 92 is located at an outer side in the rotor radial direction, and the other protrusion segment 92 is located at an inner side in the rotor radial direction, and then the brake pad 29 is shifted. Here, the case in which the protrusion segment 92 located at a rotor rotational outlet side is set to be the outer side in the rotor radial direction, and the protrusion segment 92 located at a rotor rotational inlet side is set to be the inner side in the rotor radial direction has been described as an example. However, this may of course be set to the opposite.

Due to such shifting, only one protrusion segment 92 located at the outer side in the rotor radial direction is caused to pass between the intermediate extensions 41 and 61 of both sides in the rotor rotational direction, and is located at the outer side in the rotor radial direction relative to the intermediate extensions 41 and 61. Thereby, the pad-side cutout 93 of the brake pad 29 which is adjacent to one protrusion segment 92 is caused to face the intermediate extension 41.

Next, the brake pad 29 is shifted toward the intermediate extension 41, to which one protrusion segment 92 located at the outer side in the rotor radial direction comes close in the rotor rotational direction, in the rotor rotational direction. Then, one protrusion segment 92 of the brake pad 29 is slantly inserted between the cover plate portion 125 and the mounting plate portion 121 of the pad retainer 28 installed on the pad support 40, and the pad-side cutout 93 facing the face 56 of the caliper-side cutout 55 located at the intermediate extension 41 comes into contact with the face 56 on the face 108. When the protrusion segment 92 is slantly inserted between the cover plate portion 125 and the mounting plate portion 121 of the pad retainer 28, the protrusion segment 92 passes through the center recess 130 because the center recess 130 shown in FIG. 12 is formed in the front of the mounting plate portion 121. Thereby, the protrusion segment 92 substantially passes between the cover plate portion 125 and the pad engaging face 45, thus facilitating insertion.

As described above, in the brake pad 29 of the state in which the face 108 of the pad-side cutouts 93 facing the face 56 of the caliper-side cutout 55 comes into contact with the face 56, a distance from the contact position to the face 102 of the other protrusion segment 92 is shorter than a distance from the contact position to the face 76 of the other intermediate extension 61. Accordingly, in this state, as in a locus shown in FIG. 14, when the brake pad 29 is rotated such that the other protrusion segment 92 that has been located at the inner side in the rotor radial direction of the intermediate extension 61 extends over the intermediate extension 61 to the outer side in the rotor radial direction, the other protrusion segment 92 is located at the outer side in the rotor radial direction of the intermediate extension 61 by way of the side of the intermediate extension 41 relative to the intermediate extension 61. When the brake pad 29 is rotated, the liner 90 is disposed at the side of the cylinder part 11 in the rotor axial direction, and the friction materials 111 and 112 are disposed at the opposite side of the cylinder part 11. For this reason, the liner 90 comes into contact with the pressing plate portions 162 and 162 of the pair of biasing segments 152 and 152 provided in the pad spring 31 installed on the intermediate connector part 16 at the side closer to the cylinder part 11, and is rotated while elastically deforming the biasing segments 152 and 152.

Next, the brake pad 29 is shifted toward the intermediate extension 61 in the rotor rotational direction, and thus the other protrusion segment 92 is inserted between the cover plate portion 125 and the mounting plate portion 121 of the pad retainer 28 installed on the pad support 60. In this process, as shown in FIG. 8, positions of the faces 95 and 95 of the main plate 91 in the rotor rotational direction are aligned with positions of the torque receiving faces 46 and 66. In this way, in the state in which the positions of the faces 95 and 95 in the rotor rotational direction are fitted to the torque receiving faces 46 and 66, one protrusion segment 92 is kept disposed between the cover plate portion 125 and the mounting plate portion 121 of the pad retainer 28 installed on the pad support 40, and the other protrusion segment 92 is kept disposed between the cover plate portion 125 and the mounting plate portion 121 of the pad retainer 28 installed on the pad support 60. Further, in this state, the biasing segment 152 located at the rotor rotational inlet side of the pad spring 31 comes into contact with the face 96 of the liner 90 of the brake pad 29 at the curved plate portion 163 of the pressing plate portion 162, and the biasing segment 152 located at the rotor rotational outlet side comes into contact with the face 104 of the rotor rotational outlet side of the liner 90 of the brake pad 29 at the curved plate portion 163 of the pressing plate portion 162.

In this state, the brake pad 29 is shifted in the rotor axial direction so that the liner 90 comes close to the cylinder part 11. Then, the liner 90 of the brake pad 29 slides on the wide pressing plate portions 162 and 162 of the biasing segments 152 and 152 provided in the pad spring 31 at the side closer to the cylinder part 11, and the protrusion segments 92 and 92 slide on the mounting plate portions 121 and 121 of the pad retainers 28 and 28. In this process, the faces 95 and 95 of the main plate 91 are inserted between the torque receiving faces 46 and 66. In this case, since the contact plate portions 123 and 123 of the pad retainers 28 and 28 pass through the pad-side cutouts 93 and 93 of the brake pad 29, there is no interference with one brake pad.

As described above, in the brake pad 29 disposed at the side of the cylinder part 11, the protrusion segments 92 and 92 overlap the position in the rotor axial direction with the pad guides 42 and 62 located at the side of the cylinder part 11 in the rotor axial direction of the caliper main body 5. One protrusion segment 92 overlaps the position in the rotor axial direction with the pad guide 42, and the other protrusion segment 92 overlaps the position in the rotor axial direction with the pad guide 62. As a result, the caliper main body 5 is in a state in which the pad guides 42 and 62, which are located at the side of the cylinder part 11 in the rotor axial direction and at both sides of the cylinder part 11 in the rotor rotational direction, support the brake pad 29 located at the side of the cylinder part 11 by way of the pad retainers 28 and 28.

Further, in this state, the brake pad 29 located at the side of the cylinder part 11 is configured such that the face 104 of the rotor rotational outlet side thereof comes into contact with the curved plate portion 163 of the biasing segment 152 of the rotor rotational outlet side of the biasing segments 152 and 152 located at the side of the cylinder part 11 in the rotor axial direction of the pad spring 31, and such that the face 96 thereof comes into contact with the curved plate portion 163 of the biasing segment 152 of the rotor rotational inlet side. Thereby, the brake pad 29 located at the side of the cylinder part 11 is biased in the rotor rotational outlet direction and inward in the rotor radial direction by the biasing segment 152 of the rotor rotational outlet side, is biased inward in the rotor radial direction by the biasing segment 152 of the rotor rotational inlet side, is pushed against the mounting plate portions 121 and 121 of the pad retainers 28 and 28, and is pushed against the torque receiving face 46.

The brake pad 29 at the side of the cylinder part 11, which is assembled as described above, is pressed by the biasing segments 152 and 152 of the pad spring 31 which are located at the side of the cylinder part 11. Thereby, the brake pad 29 moves on the mounting plate portions 121 and 121 in the rotor axial direction while being supported on the pad guides 42 and 62 located at the side of the cylinder part 11 via the pad retainers 28 and 28.

In contrast, when one protrusion segment 92 located at the outer side in the rotor radial direction crosses the intermediate extension 61 toward the outer side in the rotor radial direction first, the brake pad 29 is shifted toward the intermediate extension 61, which approaches one protrusion segment 92 located at the outer side in the rotor radial direction, in the rotor rotational direction, and is then rotated such that the other protrusion segment 92 that has been located at the inner side in the rotor radial direction relative to the intermediate extension 41 crosses the intermediate extension 41 toward the outer side in the rotor radial direction. Afterwards, the brake pad 29 is shifted toward the intermediate extension 41 to which the other protrusion segment 92 comes close in the rotor rotational direction.

Next, another brake pad 29 is adapted to assume such a posture that the protrusion segments 92 and 92 are disposed at an outer side in the rotor radial direction and that the liner 90 is directed to the side of the cylinder part 10 having the pistons 6 and 7 that are to press the protrusion segments 92 and 92, and similarly to the foregoing, is disposed such that the protrusion segments 92 and 92 overlap the position in the rotor axial direction on the pad guides 42 and 62 located at the side of the cylinder part 10 in the rotor axial direction of the caliper main body 5. Thereby, the pad guides 42 and 62 located at the side of the cylinder part 10 supports the brake pad 29 located at the side of the cylinder part 10 by way of the pad retainers 28 and 28. Of course, the brake pad 29 located at the side of the cylinder part 10 may be installed on the caliper 3 first, and then the brake pad 29 located at the side of the cylinder part 11 may be installed on the caliper 3.

Afterwards, the caliper 3 is installed on a vehicle body such that the disc rotor 2 is disposed between the brake pads 29 and 29. Thereby, the brake pads 29 and 29 are prevented from shifting toward the intermediate extensions 41 and 61, i.e., toward the caliper-side cutouts 55 and 75, in the rotor axial direction. As a result, the brake pad 29 located at the side of the cylinder part 10 is continuously supported by the pad guides 42 and 62 located at the side of the cylinder part 10 at the same time. The brake pad 29 located at the side of the cylinder part 11 is continuously supported by the pad guides 42 and 62 located at the side of the cylinder part 11 at the same time. Thereby, the brake pads 29 and 29 are prevented from dropping out of the caliper 3.

When the brake pads 29 and 29 are removed from the caliper 3, this work is performed in a process opposite to the aforementioned installing process. Thereby, the brake pads 29 and 29 can be removed from the caliper 3.

As described above, the brake pads 29 and 29 are movably supported by the pad guides 42 and 62 and the pad guides 42 and 62 of the pad supports 40 and 60 of the caliper main body 5 via the pad retainers 28 and 28. When the two pistons 6 and 7 provided for the outer-side cylinder part 10 press the brake pad 29 installed between the two pistons 6 and 7 and the disc rotor 2, and when the two pistons 6 and 7 provided for the inner-side cylinder part 11 press the brake pad 29 installed between the two pistons 6 and 7 and the disc rotor 2, the brake pads 29 and 29 are shifted in the rotor axial direction while being supported by the pad guides 42 and 62 and the pad guides 42 and 62 of the caliper main body 5, are pushed against the disc rotor 2, and generate a braking force in a vehicle.

In the first embodiment above, the case in which the caliper 3 has the pair of brake pads 29 and 29 disposed opposite to the disc rotor 2 has been described as an example. However, it is sufficient for the brake pads to be at least one pair. Accordingly, there may be two or more pairs of the brake pads. For example, when the caliper has two or more pairs of brake pads, such as when four pistons press respective pieces of brake pads, each brake pad can be supported by the caliper 3 in a structure similar to the aforementioned structure.

Further, in the first embodiment above, the case in which both of the pair of brake pads 29 and 29 are supported on the caliper 3 in a similar structure has been described as an example. However, at least one brake pad 29 may employ the aforementioned structure.

Further, in the first embodiment above, the case in which the caliper-side cutouts 55 and 75 are provided for the caliper main body 5, and the case in which the pad-side cutouts 93 and 93 are provided for the brake pad 29 have been described as an example, but only one of these may be adapted to be provided. That is, only the caliper-side cutouts 55 and 75 may be adapted to be provided for the caliper main body 5, and only the pad-side cutouts 93 and 93 may be adapted to be provided for the brake pad 29.

In a structure disclosed in Japanese Unexamined Patent Application, First Publication No. 2009-68593, a pair of torque receiving sleeves are installed between a pair of connector parts connecting both ends of outer body part and inner body part of a caliper by a pair of torque receiving pins and a pair of nuts, and pads are supported by the pair of torque receiving sleeves. For this reason, the pair of torque receiving sleeves, the pair of torque receiving pins, and the pair of nuts are required. For this reason, weight is increased, and the cost is also increased. Further, in the known caliper structure, since pad pins are used to hang the pads, the weight is increased, and the cost is also increased.

In contrast, in the first embodiment, the pad engaging faces 45 and 65, in which the faces 101 and 101, which are the inner regions in the rotor radial direction of the protrusion segments 92 and 92 protruding in the rotor rotational direction of the brake pad 29, are oppositely disposed on pair of end-side connector parts 12 and 13 of the caliper main body 5 in which the pair of cylinder parts 10 and 11 and the pair of end-side connector parts 12 and 13 connecting the cylinder parts are formed in one body, are configured to be formed of the same member as the caliper main body 5. For this reason, according to the first embodiment, it is unnecessary to install a separate support member to support the brake pad 29. Further, weight is reduced, and it is possible to prevent the cost and the number of parts from increasing.

Further, since the pad engaging faces 45 and 65 are located at the outer side in the radial direction relative to the disc rotor 2, and cross the disc rotor 2 to continue to both sides in the rotor axial direction, it is possible to sufficiently prevent the brake pad 29 from falling.

Further, since the torque receiving pins and the pad pins can be removed, no tool is required when the brake pad 29 is assembled to the caliper 3, and the assemblability can be improved. Further, since no screw threads such as torque receiving pins and pad pins are used, no looseness is caused, and reliability can be improved. In addition, a structural part used to assemble the torque receiving pins is not required, and the caliper main body 5 is made small in size and simple in shape.

Further, since pad engaging faces 45 and 65 can support the brake pad 29 with a wide area, durability can be improved.

Further, the brake pad 29 is configured such that the pad-side cutouts 93 and 93 recessed toward the middle side of the brake pad 29 in the rotor rotational direction are formed at the inner side in the rotor radial direction relative to the protrusion segments 92 and 92 in the rotor radial direction. When the pad-side cutouts 93 and 93 come into contact with the faces 56 and 76 that are the inner regions in the rotor radial direction relative to the pad engaging faces 45 and 45 of the end-side connector parts 12 and 13 and are aligned with the disc path parts 14 and 15 in the rotor axial direction, the middle position of the brake pad 29 in the rotor rotational direction is formed to be offset toward the contact position relative to the center between the pad guides 42 and 62 in the rotor rotational direction. Accordingly, the pair of protrusion segments 92 and 92 of the brake pad 29 can be easily disposed on the pad guides 42 and 62.

Further, the pad engaging faces 45 and 65 have the caliper-side cutouts 55 and 75 that are formed at the positions matching the disc path parts 14 and 15 in the rotor axial direction and that are partly recessed toward the outer side of the caliper main body 5 in the rotor rotational direction. When the faces 108 and 108 that are the inner positions in the rotor radial direction relative to the protrusion segments 92 and 92 of the brake pad 29 come into contact with the faces 56 and 76 of the caliper-side cutouts 55 and 75, the middle position of the brake pad 29 in the rotor rotational direction is formed to be offset toward the contact position relative to the center between the pad guides 42 and 62 in the rotor rotational direction. Accordingly, the pair of protrusion segments 92 and 92 of the brake pad 29 can be easily disposed on the pad guides 42 and 62.

Further, since the pad supports 40 and 60 do not have an undercut shape, the caliper main body 5 including the pad supports 40 and 60 can be easily molded by casting.

Further, since the pad engaging faces 45 and 65 are independent of the torque receiving faces 46 and 66, the torque receiving faces 46 and 66 can be made small.

In a structure disclosed in Japanese Unexamined Patent Application, First Publication No. 2005-23977, a connector part is installed on a caliper main body to cross a pad assembling space of the caliper main body in a rotor axial direction, and a pad spring used to prevent rattling of brake pads is assembled to the connector part. However, the pad spring has an asymmetrical shape with respect to the center in a longitudinal direction thereof, and has a direction to assembly. As such, it cannot be said that the workability is good. Further, since the shape of the pad springs differ for the caliper disposed on the left side of a vehicle body and for the caliper disposed on the right side of the vehicle body, the parts cannot be used in common, and thus the cost is increased.

In contrast, according to the present embodiment, since the pad spring 31 has a symmetrical shape with respect to the center in the longitudinal direction thereof and a symmetrical shape with respect to the center in the depth direction thereof, the direction to assembly can be removed. Accordingly, workablility of assembling the pad spring 31 to the caliper main body 5 can be improved, and the number of assembling processes can be reduced. Further, since the direction to assembly can be removed, a posture of the pad spring 31 can be stabilized, and vibration resistance can be improved. In addition, since the pad spring 31 can be used as a common part for the caliper disposed on the left side of the vehicle body and for the caliper disposed on the right side of the vehicle body, the manufacturing cost and managing cost can be reduced.

Further, in the state in which the center in the longitudinal direction of the pad spring 31 is offset to the rotor rotational outlet side with respect to the center in the rotor rotational direction of the brake pads 29 and 29, the pad spring 31 is engaged with the intermediate connector part 16 at the pair of claw portions 151 and 151. For this reason, even when the pad spring 31 has the symmetrical shape with respect to the center in the longitudinal direction thereof, a biasing force can be given to the brake pads 29 and 29 in the specified rotor rotational outlet direction. In other words, the pad spring 31 is installed in the state in which it is offset to the rotor rotational outlet side with respect to the center in the rotor rotational direction of the brake pads 29 and 29. Thereby, even when the pad spring 31 has the symmetrical shape with respect to the center in the longitudinal direction thereof, the biasing force can be given in the specified rotor rotational outlet direction. Accordingly, the entire length of the pad spring 31 can be reduced, and the pad spring 31 can become small and light.

Further, the pressing plate portion 162 of the biasing segment 152 of the pad spring 31 biases the face 96 perpendicular to the line connecting the center of the brake pad 29 in the rotor rotational direction and the center of the disc rotor 2, biases the brake pad 29 in the central direction of the disc rotor 2, biases the face 104 that intersects with respect to the rotor rotational outlet direction of the brake pad 29 and is formed to be inclined with respect to the face 96, and biases the brake pad 29 in the rotational and central directions of the disc rotor 2. Accordingly, it is possible to sufficiently bias the brake pad 29 in the rotational and central directions of the disc rotor 2.

Further, one claw portion 151 of the pad spring 31 is inserted into a hole portion 34 formed in the intermediate connector part 16. Thereby, since the position of the pad spring 31 is defined relative to the brake pad 29, it is possible to prevent improper assembly. Therefore, since the brake pads 29 can be reliably biased to the rotor rotational outlet side by the pad spring 31, it is possible to suppress brake noise, pad rattling noise, rising delay of brake torque.

Further, since the pad spring 31 has the symmetrical shape with respect to the center in the longitudinal direction thereof, and since the pair of claw portions 151 and 151 is symmetrically disposed, the posture of the pad spring 31 can be stabilized, and a variation in biasing position of the pad spring 31 can be suppressed.

Second Embodiment

Next, a disc brake according to a second embodiment of the present invention will be described mainly based on FIGS. 15 to 23 focusing on portions different from those of the first embodiment. Note that portions common to the first embodiment will be given the same names and reference numbers.

Figure 15:
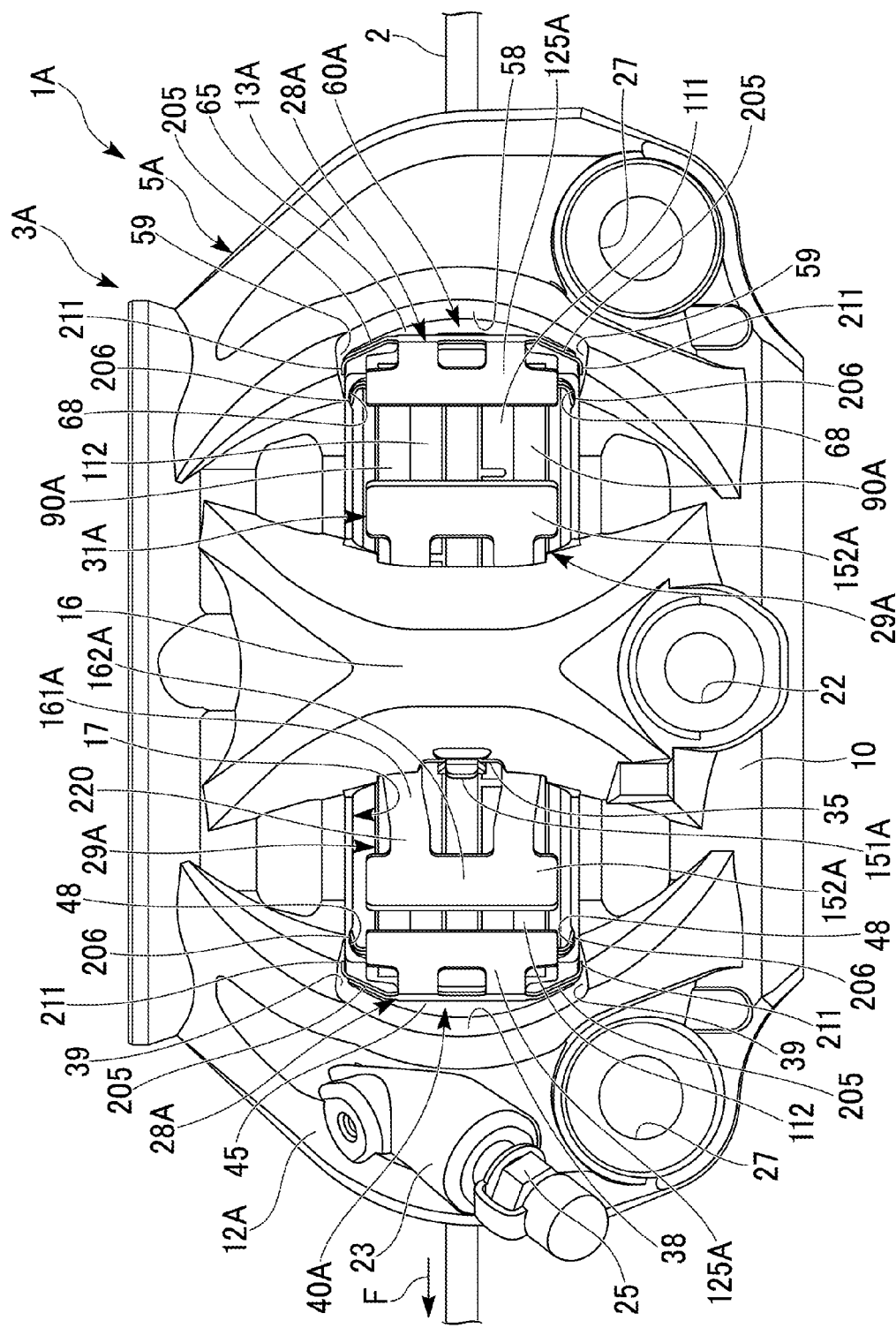
FIG. 15 is a plan view showing a disc brake of a second embodiment according to the present invention.

As shown in FIG. 15, a disc brake 1A according to a second embodiment has a caliper 3A that is partly different from the caliper 3 of the first embodiment. In the caliper 3A, pad retainers 28A and 28A different from the pad retainers 28 and 28 of the first embodiment and a pad spring 31A partly different from the pad spring 31 of the first embodiment are used.

Figure 16:
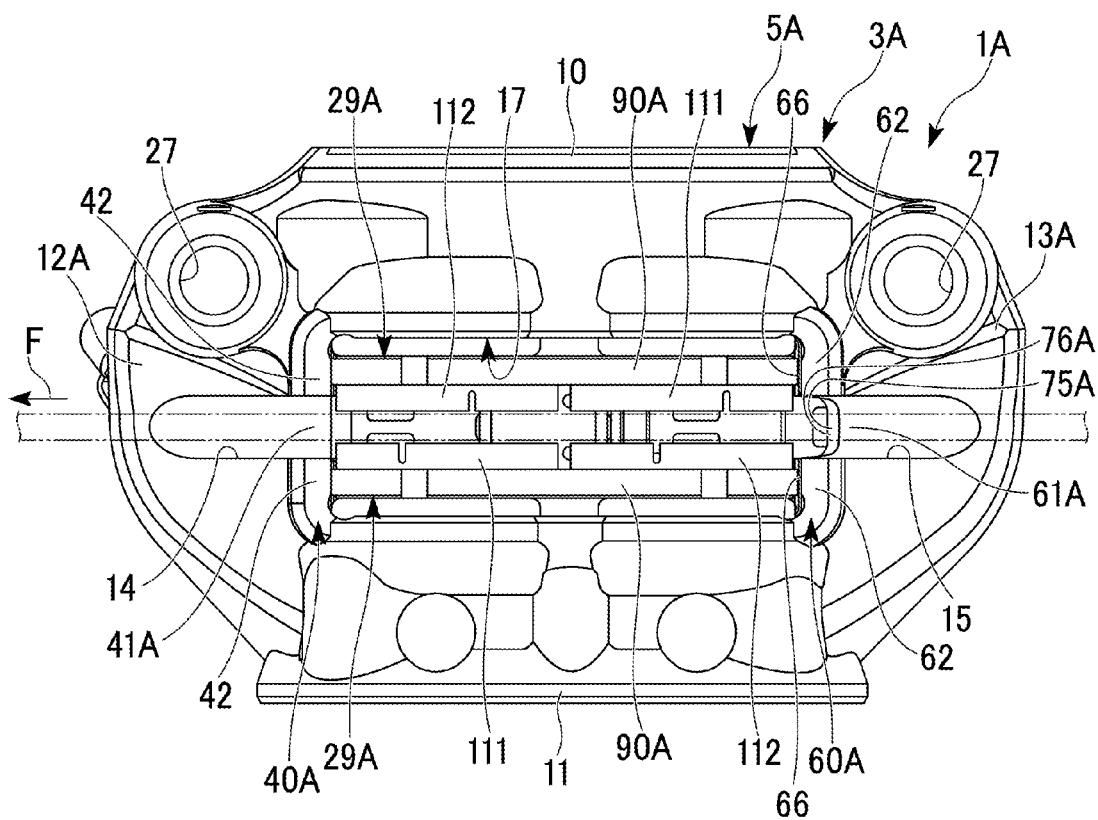
FIG. 16 is a bottom view showing the disc brake of the second embodiment according to the present invention.
Figure 17:
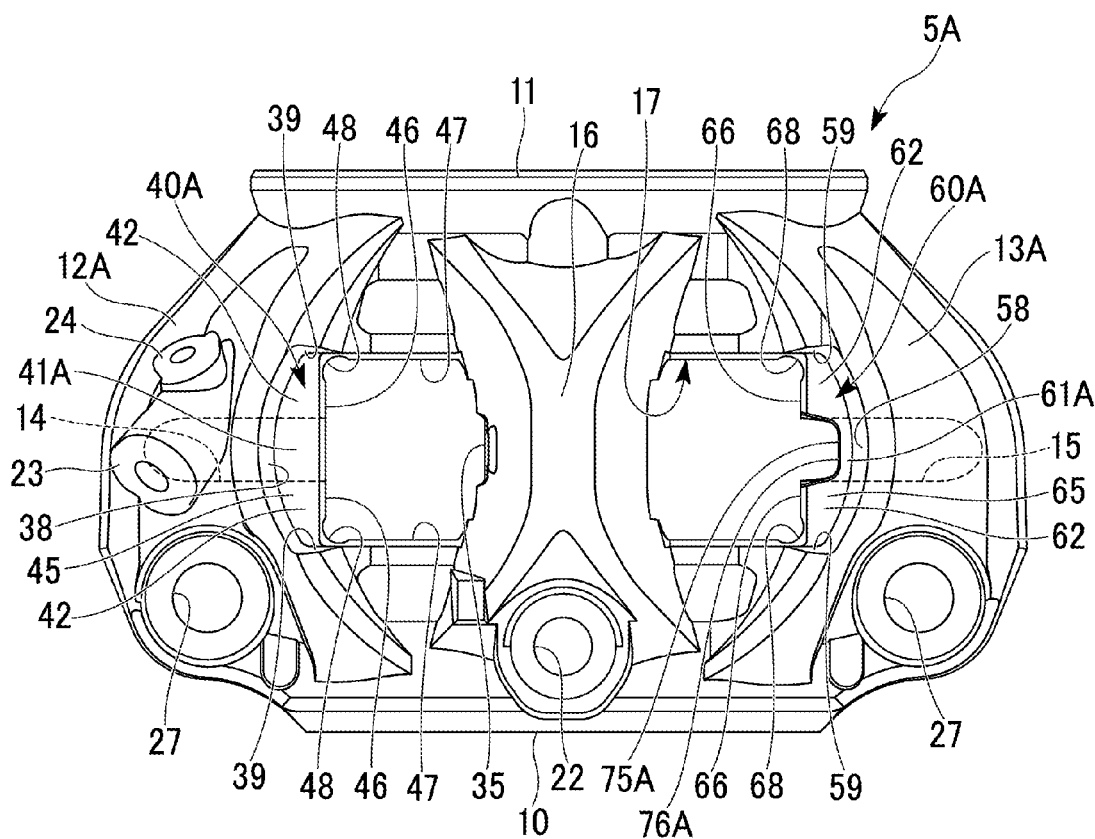
FIG. 17 is a plan view showing a caliper main body of the disc brake of the second embodiment according to the present invention.

Further, as shown in FIGS. 16 and 17, in the caliper 3A of the second embodiment, a caliper main body 5A partly different from the caliper main body 5 of the first embodiment is used. The caliper main body 5A has end-side connector parts 12A and 13A that are partly different from the end-side connector parts 12 and 13 of the first embodiment. In detail, the end-side connector parts 12A and 13A have pad supports 40A and 60A that are partly different from the pad supports 40 and 60 of the first embodiment.

In other words, in the first embodiment, the caliper-side cutouts 55 and 75 are provided for the pad supports 40 and 60 located at both sides in a rotor rotational direction. In contrast, the caliper main body 5A of the second embodiment has the support 40A, for which the caliper-side cutout 55 of the first embodiment is not provided, at a rotor rotational outlet side thereof. In other words, the intermediate extension 41A of the pad support 40A of the rotor rotational outlet side aligns an end position of a rotor rotational inlet side with the pad guides 42 and 42.

Further, the caliper main body 5A has the pad support 60A, in which a caliper-side cutout 75A recessed to be deeper than the caliper-side cutout 75 of the first embodiment is formed at the rotor rotational inlet side relative to the torque receiving faces 66 and 66, at the rotor rotational inlet side thereof. The caliper-side cutout 75A is also configured such that a face 76A closest to the rotor rotational inlet side thereof is located at the rotor rotational inlet side relative to the torque receiving faces 66 and 66. In other words, an intermediate extension 61A of the pad support 60A of the rotor rotational inlet side offsets an end position of the rotor rotational outlet side toward the rotor rotational inlet side relative to the pad guides 62 and 62.

Figure 18:
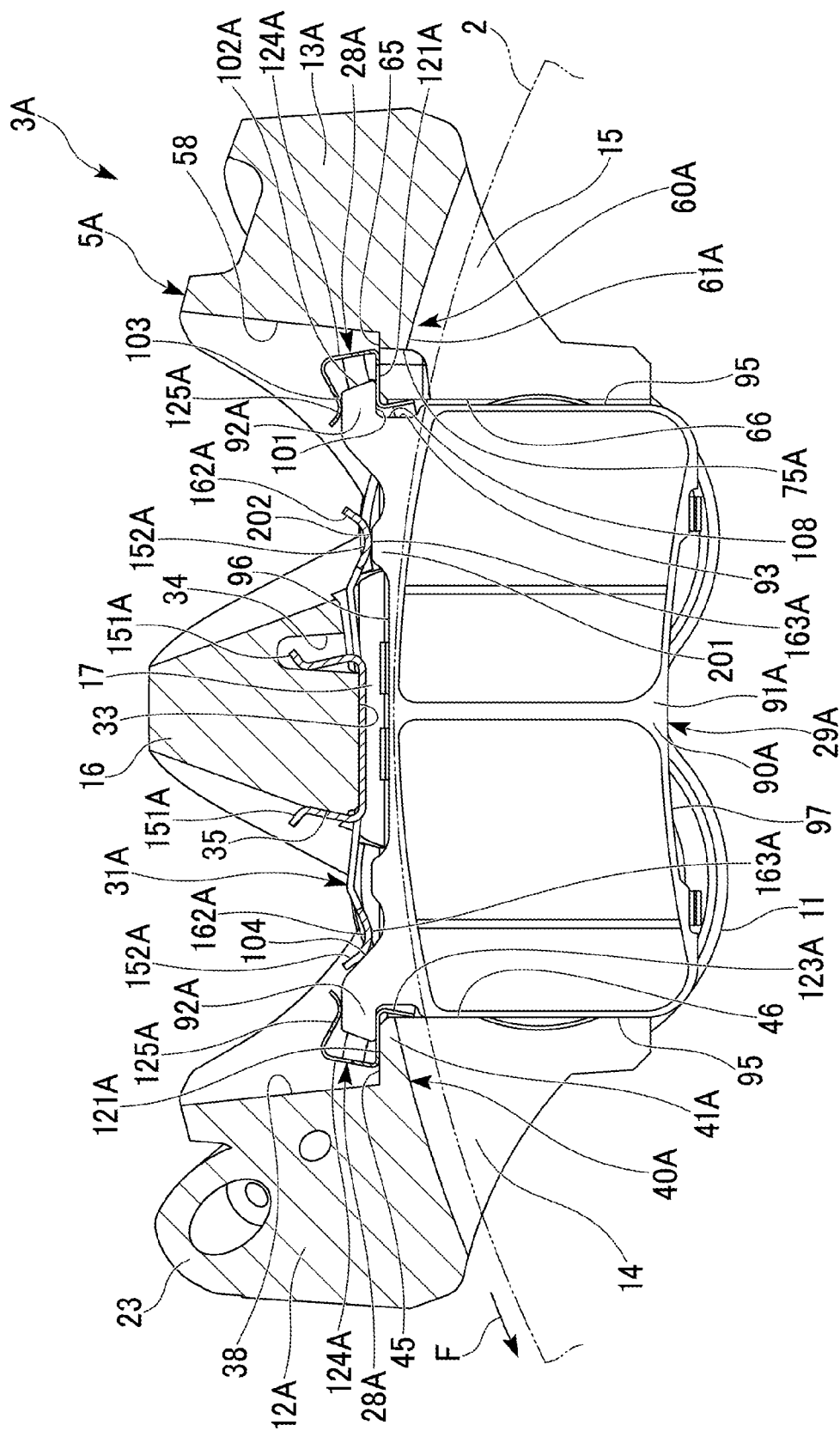
FIG. 18 is a cross-sectional view of the disc brake of the second embodiment according to the present invention.
Figure 19:
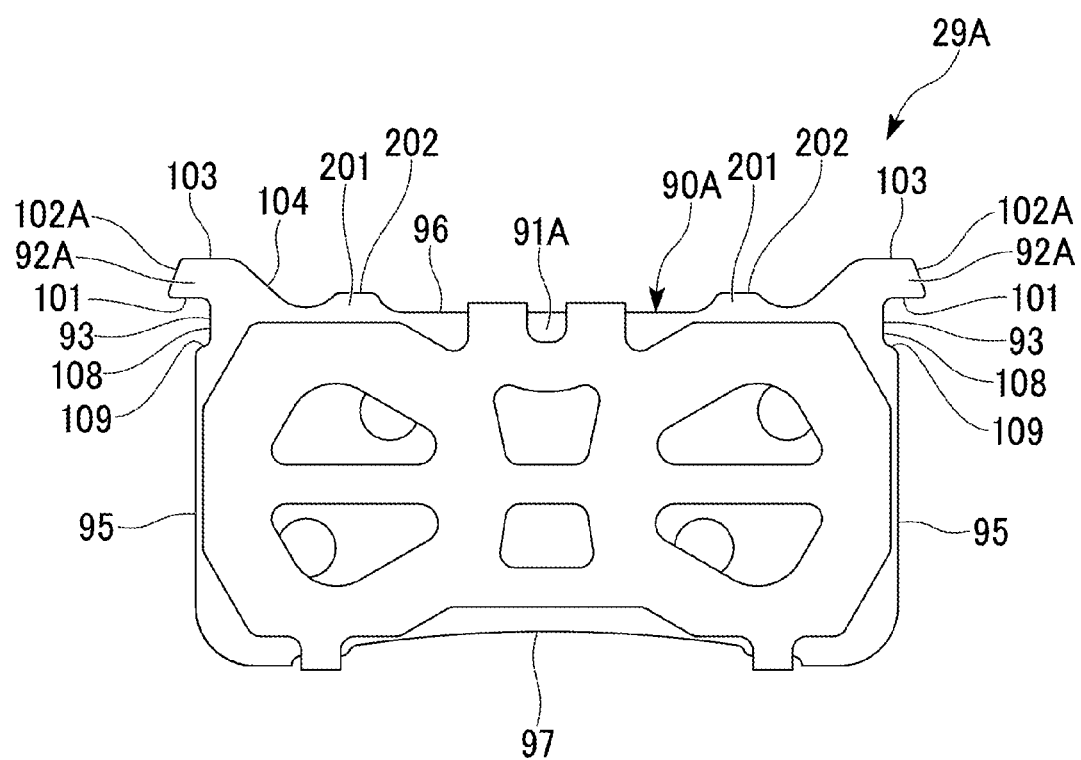
FIG. 19 is a rear view showing a brake pad of the disc brake of the second embodiment according to the present invention.

Further, in the disc brake 1A according to the second embodiment, as shown in FIGS. 18 and 19, brake pads 29A and 29A that are partly different from the brake pads 29 and 29 of the first embodiment are used. The brake pads 29A and 29A each have a liner 90A that is partly different from the liner 90 of the first embodiment. In detail, the liner 90A has protrusion segments 92A and 92A that are partly different from the protrusion segments 92 and 92. The protrusion segments 92A and 92A are provided with faces 102A and 102A having different angles from the faces 102 and 102 of the protrusion segments 92 and 92. The faces 102A and 102A are inclined with the approach to outer sides thereof in the rotor radial direction so as to be located at an inner side in the rotor rotational direction.

Further, the liner 90A has a main plate 91A partly different from the main plate 91. The main plate 91A has a shape in which seat portions 201 and 201 protruding outward in the rotor radial direction are formed at an inner position in the rotor rotational direction of the protrusion segments 92A and 92A. Faces 202 and 202 of the seat portions 201 and 201 are formed parallel to the face 96.

As shown in FIG. 20, the pad retainer 28A is formed in mirror symmetry with respect to the center in a longitudinal direction thereof. The pad retainer 28A has a mounting plate portion 121A, a standing plate portion 124A, a cover plate portion 125A, a pair of engaging plate portions 205 and 205, a pair of contact plate portions 123A and 123A, and a pair of engaging plate portions 206 and 206.

A longitudinal direction of the mounting plate portion 121A is the longitudinal direction (width direction) of the pad retainer 28A. The mounting plate portion 121A is provided with a center recess 130A recessed from one edge in a depth direction thereof within a predetermined range of the middle in the longitudinal direction thereof. Further, the mounting plate portion 121 is provided with cutouts 132A and 132A that are formed at a side opposite to the center recess 130A in the depth direction thereof within a predetermined range of both ends in the longitudinal direction thereof.

The standing plate portion 124A extends from the other edge located at the side opposite to the center recess 130A in the depth direction of the mounting plate portion 121A to one side in a thickness direction of the mounting plate portion 121. An angle between the standing plate portion 124A and the mounting plate portion 121A is an acute angle less than 90 degrees.

The cover plate portion 125A extends from an end edge of the standing plate portion 124A which is located at the side opposite to the mounting plate portion 121A to the same side as the mounting plate portion 121A in the depth direction of the mounting plate portion 121A. The cover plate portion 125A is configured such that a side of the standing plate portion 124A is a proximal-end plate portion 139A that has the same length as the standing plate portion 124A, and such that a side opposite to the standing plate portion 124A is a distal-end plate portion 140A that is longer than the proximal-end plate portion 139A at both sides in the longitudinal direction thereof. The proximal-end plate portion 139A is configured such that a portion thereof abutting the standing plate portion 124A has the shape of a curved plate whose center is located at the side of the mounting plate portion 121A, and such that the side opposite to the standing plate portion 124A is inclined with the approach to a tip side thereof so as to approach the mounting plate portion 121A. The distal-end plate portion 140A is configured such that a side of the proximal-end plate portion 139A is a curved plate portion 141A whose center is located at the side opposite to the mounting plate portion 121A, and such that a side opposite to the proximal-end plate portion 139A is an inclined plate portion 142A that is inclined with the approach to a tip side thereof so as to be separated from the mounting plate portion 121A in the thickness direction of the mounting plate portion 121A, and that has a flat plate shape. A cutout 208 is formed in the center in the longitudinal direction of a boundary position between the standing plate portion 124A and the cover plate portion 125A.

The pair of engaging plate portions 205 and 205 extends from both ends in the longitudinal direction of the standing plate portion 124A to both sides in the longitudinal direction of the standing plate portion 124A. Each of the engaging plate portions 205 and 205 has an inclined plate portion 210 that is located at a side of the standing plate portion 124A and is inclined to be located in front of the extending direction of the cover plate portion 125A in proportion as they are separated from the standing plate portion 124A, and a distal-end plate portion 211 that extends from a side of the inclined plate portion 210 which is a side opposite to the standing plate portion 124A in the extending direction of the cover plate portion 125A.

The contact plate portions 123A and 123A are one edge of the mounting plate portion 121A which is located at the side of the center recess 130A in the depth direction of the mounting plate portion 121A, and are formed at both sides of the center recess 130A in the longitudinal direction of the mounting plate portion 121A. The pair of contact plate portions 123A and 123A slantly extend from the mounting plate portion 121A to a side opposite to the standing plate portion 124A in the thickness direction of the mounting plate portion 121A with the approach to extension tip sides thereof so as to be located at a middle side in the depth direction of the mounting plate portion 121A.

The pair of engaging plate portions 206 and 206 is formed at both ends of the mutual opposite sides of the contact plate portions 123A and 123A. Each of the pair of engaging plate portions 206 and 206 extends to a side opposite to the standing plate portion 124A in the thickness direction of the contact plate portion 123A. The pair of engaging plate portions 206 and 206 slantly extend with the approach to extension tip sides thereof so that an interval therebetween is widened.

As shown in FIG. 15, the pair of pad retainers 28A and 28A is installed on the pad supports 40A and 60A of the caliper main body 5A. In other words, one pad retainer 28A is engaged with a pair of faces 39 and 39 of a concave wall 38 at the distal-end plate portions 211 and 211 of the engaging plate portions 205 and 205, and is engaged with escape faces 48 and 48 at the engaging plate portions 206 and 206. Furthermore, one pad retainer 28A comes into contact with a pad engaging face 45 of the pad support 40A shown in FIG. 17 at the mounting plate portion 121A shown in FIG. 20, and comes into contact with torque receiving faces 46 and 46 of the pad support 40A shown in FIG. 17 at the contact plate portions 123A and 123A shown in FIG. 20.

Similarly, as shown in FIG. 15, the other pad retainer 28A is engaged with a pair of faces 59 and 59 of a concave wall 58 at the distal-end plate portions 211 and 211 of the engaging plate portions 205 and 205, and is engaged with escape faces 68 and 68 at the engaging plate portions 206 and 206. Furthermore, the other pad retainer 28A comes into contact with a pad engaging face 65 of the pad support 60A shown in FIG. 17 at the mounting plate portion 121A shown in FIG. 20, and comes into contact with torque receiving faces 66 and 66 of the pad support 60A shown in FIG. 17 at the contact plate portions 123A and 123A shown in FIG. 20. Then, in the pad retainer 28A, the center recess 130A shown in FIG. 20 is aligned with the caliper-side cutout 75A of the pad support 60A shown in FIG. 17 in the rotor axial direction.

The pair of brake pads 29A and 29A, only one of which is shown in FIG. 18, are supported on the caliper main body 5A via the pad retainers 28A and 28A that have been installed on the pad supports 40A and 60A of the caliper main body 5A. When disposed on this caliper main body 5A, the pair of brake pads 29A and 29A are each configured such that one protrusion segment 92A is inserted between the mounting plate portion 121A and the cover plate portion 125A of the pad retainer 28A disposed on the pad support 40A, and such that the other protrusion segment 92A is inserted between the mounting plate portion 121A and the cover plate portion 125A of the pad retainer 28A disposed on the pad support 60A.

In this case, in the respective brake pads 29A and 29A, the protrusion segments 92A and 92A are configured such that the faces 101 and 101 thereof come into contact with the mounting plate portions 121A and 121A of the pad retainers 28A and 28A, and such that the faces 103 and 103 thereof come into contact with the cover plate portions 125A and 125A. Further, in this case, the faces 102A and 102A of the protrusion segments 92A and 92A are configured to be separated from both of the standing plate portions 124A and 124A of the pad retainers 28A and 28A at an interval. Furthermore, in this case, each of the brake pads 29A and 29A causes the faces 108 and 108 to be separated from the contact plate portions 123A and 123A. The caliper main body 5A is configured such that the pad guides 42 and 62 shown in FIG. 17 at one side in the rotor axial direction thereof support one brake pad 29A via the mounting plate portions 121A and 121A of the pad retainers 28A and 28A shown in FIG. 20, and such that the pad guides 42 and 62 shown in FIG. 17 at the other side in the rotor axial direction thereof support the other brake pad 29A via the mounting plate portions 121A and 121A of the pad retainers 28A and 28A shown in FIG. 20.

As shown in FIG. 21, the pad spring 31A is formed in mirror symmetry with respect to the center in the longitudinal direction (width direction) thereof, and is formed in mirror symmetry with respect to the center in the depth direction. The pad spring 31A has a base plate portion 150 that is similar to that of the pad spring 31 of the first embodiment, claw portions 151A and 151A that are partly different from those of the pad spring 31 of the first embodiment, and a pair of biasing segments 152A and 152A that are different from those of the pad spring 31 of the first embodiment and are located at both sides in the longitudinal direction thereof.

Each of the claw portions 151A and 151A has a proximal-end plate portion 156A that is partly different from the proximal-end plate portion 156 of the claw portions 151 of the first embodiment. The proximal-end plate portion 156A has a shape that becomes thin in the depth direction of the pad spring 31A with the approach to a side opposite to the base plate portion 150. Further, each of the claw portions 151A and 151A has a distal-end plate portion 157A that is partly different from the distal-end plate portion 157 of the claw portions 151 of the first embodiment. The distal-end plate portion 157A is thinner in the depth direction of the pad spring 31A than the distal-end plate portion 157.

One biasing segment 152A of the pad spring 31A extends from one side of the base plate portion 150, which is located in the longitudinal direction of the pad spring 31A, to the longitudinal direction of the pad spring 31A. The biasing segment 152A has a pair of arm plate portions 161A and 161A, a pair of intermediate plate portions 220 and 220, and a pressing plate portion 162A. As shown in FIG. 21B, the pair of arm plate portions 161A and 161A extend from the same side as a pair of lateral plate portions 155 and 155 of the base plate portion 150 on the same plane as lateral plate portions 155 and 155 in the same direction. As shown in FIG. 21B, the pair of arm plate portions 161A and 161A are inclined to come close to each other with the approach to extension tip sides thereof. The intermediate plate portions 220 and 220 extend from ends of the arm plate portions 161A and 161A which are located at a side opposite to the base plate portion 150 in a direction opposite to the base plate portion 150. The intermediate plate portions 220 and 220 are inclined with the approach to extension tip sides thereof so as to be located at a side opposite to the claw portion 151A in the thickness direction of the arm plate portions 161A and 161A.

The pressing plate portion 162A connects sides of the intermediate plate portions 220 and 220 which are located at a side opposite to the arm plate portions 161A and 161A. The pressing plate portion 162A has a shape that continues from the inner side to the outer side of the disc rotor 2. In other words, the pressing plate portion 162A is formed to continuously extend across the pair of brake pads 29A and 29A in the rotor axial direction. The pressing plate portion 162A is configured such that its side adjacent to the intermediate plate portions 220 and 220 is a curved plate portion 163A having a shape of a curved plate whose center is located at the side of the claw portion 151A in the thickness direction of the arm plate portions 161A and 161A. Further, the pressing plate portion 162A is configured such that its side opposite to the arm plate portions 161A and 161A is a distal-end plate portion 164A that is inclined to be located at the side of the claw portion 151A in the thickness direction of the arm plate portions 161A and 161A and at an outer side in the longitudinal direction of the pad spring 31A with the approach to an extension tip side thereof.

The other biasing segment 152A of the pad spring 31A has the same shape as one biasing segment 152A, and extends from a side of the base plate portion 150, which is located at a side opposite to one biasing segment 152A in the longitudinal direction of the pad spring 31A, to the longitudinal direction of the pad spring 31A.

As shown in FIG. 18, the pad spring 31A is engaged with an intermediate connector part 16 by the pair of claw portions 151A and 151A similar to the first embodiment, and is thereby installed on the caliper main body 5A. In this state, the pair of biasing segments 152A and 152A extend to both sides in the rotor rotational direction relative to the pair of claw portions 151A and 151A.

Further, similar to the first embodiment, the pad spring 31A of the state in which the pair of claw portions 151A and 151A are engaged with the intermediate connector part 16 is configured such that the center thereof in the longitudinal direction is offset in the rotor rotational direction with respect to the center in the rotor rotational direction of the caliper main body 5A, and such that positions thereof in the rotor radial and rotational directions are defined relative to the brake pads 29A and 29A whose positions in the rotor radial and rotational directions are defined relative to the caliper main body 5A. In this case, the biasing segments 152A and 152A of the pad spring 31A have a shape that continues from the inner side to the outer side of the disc rotor 2.

The pad spring 31A whose positions in the rotor radial and rotational directions are defined with respect to the brake pads 29A and 29A and which is installed on the caliper main body 5A is configured such that the biasing segment 152A located at the rotor rotational inlet side comes into contact with the faces 202 and 202 of the seat portions 201 and 201 of the liners 90A and 90A of the brake pads 29A and 29A at the curved plate portion 163A of the pressing plate portion 162A, is elastically deformed toward the outer side in the rotor radial direction, and biases the seat portions 201 and 201 inward in the rotor radial direction. Further, the pad spring 31A is configured such that the biasing segment 152A located at the rotor rotational outlet side comes into contact with the faces 104 and 104 of the rotor rotational outlet side of the liners 90A and 90A of the brake pads 29A and 29A at the curved plate portion 163A of the pressing plate portion 162A, is elastically deformed toward the outer side in the rotor radial direction, and causes the faces 104 and 104 to be biased in the rotor rotational outlet direction and inward in the rotor radial direction by inclinations of the faces 104 and 104.

In other words, the curved plate portion 163A of the biasing segment 152A of the rotor rotational outlet side of the pad spring 31A constitutes a rotor-radial-direction biasing portion that biases the faces 202 and 202 of the seat portions 201 and 201 perpendicular to the radial reference line that connects the centers in the rotor rotational direction of the brake pads 29A and 29A and the center of the disc rotor 2, and a rotor-rotational-outlet-direction biasing portion that biases the faces 104 and 104 that intersect each other with respect to the rotor rotational outlet direction of the brake pads 29A and 29A and are formed to be inclined with respect to the faces 202 and 202.

The pad spring 31A whose positions in the rotor radial and rotational directions are defined with respect to the brake pads 29A and 29A and which is installed on the caliper main body 5A is configured such that, when one of the biasing segments 152A and 152A which extends to one side (rotational inlet side) in the rotor rotational direction relative to the pair of claw portions 151A and 151A is brought into contact with the faces 202 and 202 of the brake pads 29A and 29A by the curved plate portion 163A, the other of the biasing segments 152A and 152A which extends to the other side (rotational outlet side) in the rotor rotational direction relative to the pair of claw portions 151A and 151A is brought into contact with the faces 104 and 104 of the brake pads 29A and 29A by the curved plate portion 163A.

Next, an example of a process of installing the pair of brake pads 29A and 29A on the caliper 3A will be described. Here, the installation of the brake pad 29A disposed on the side of the cylinder part 11 will be described mainly with reference to FIGS. 22, 23A and 23B.

Figure 22:
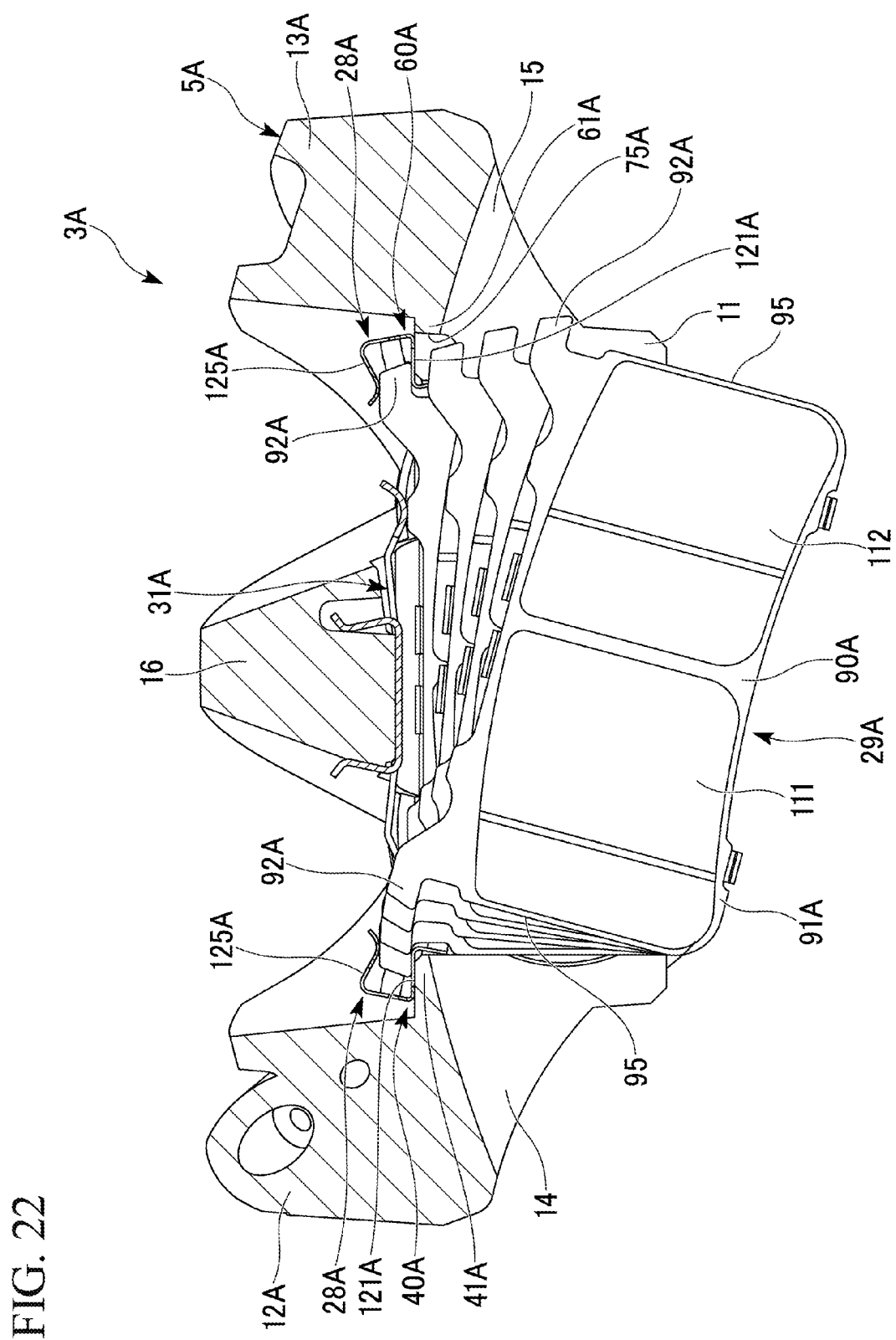
FIG. 22 is a cross-sectional view showing a locus of the brake pad of the disc brake of the second embodiment according to the present invention when the brake pad is assembled.

As shown in FIG. 22, the pad retainers 28A and 28A are installed on the pad supports 40A and 60A of the caliper main body 5A as described above, and the pad spring 31A is installed on the intermediate connector part 16 of the caliper main body 5A as described above.

In this state, the brake pad 29A is adapted to assume such a posture that the protrusion segments 92A and 92A are disposed at an outer side in the rotor radial direction, and that the liner 90A is directed to the cylinder part 11 in the rotor axial direction. The brake pad 29A having such a posture is shifted from the inner side to the outer side in the rotor radial direction.

Figure 23A:
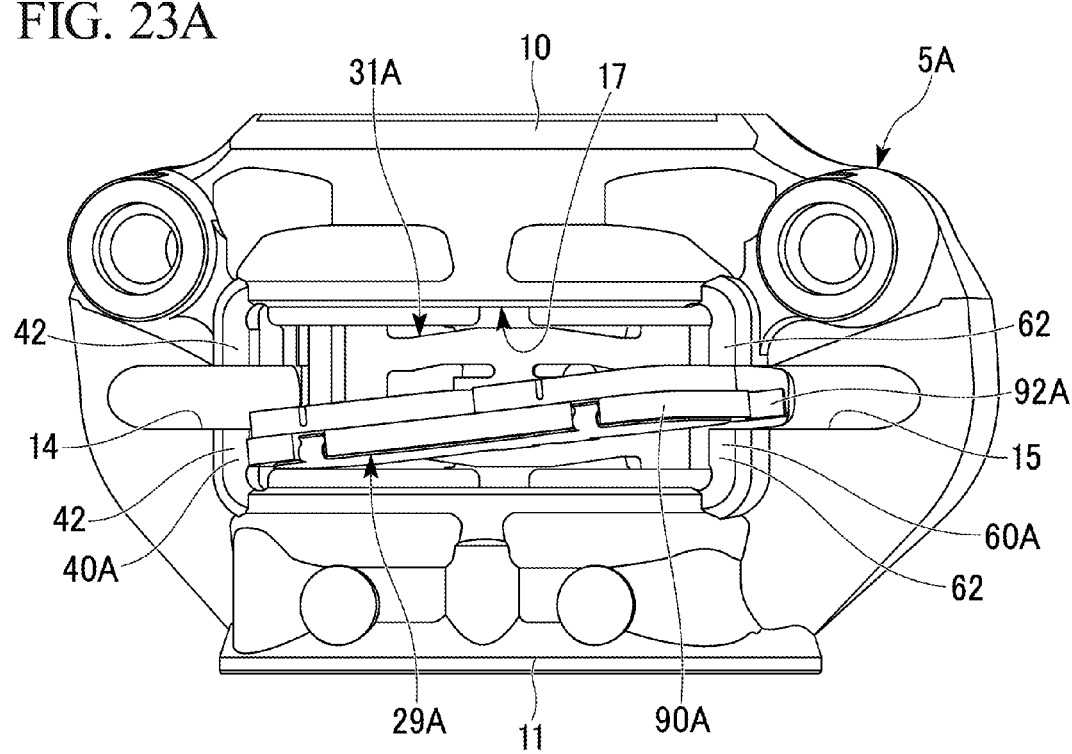
FIG. 23A is a bottom view showing a process of assembling the brake pads of the disc brake of the second embodiment according to the present invention when the brake pad is assembled.

In this case, as shown in FIG. 22, the brake pad 29 A is inclined so that the protrusion segment 92A located at the rotor rotational outlet side is located at the outer side in the rotor radial direction, and the protrusion segment 92A located at the rotor rotational inlet side is located at the inner side in the rotor radial direction, and then the brake pad 29A is shifted. This shifting causes only the protrusion segment 92A located at the rotor rotational outlet side that is the outer side in the rotor radial direction to pass between the intermediate extensions 41A and 61A located at both sides in the rotor rotational direction, and to be located at the outer side in the rotor radial direction relative to the intermediate extensions 41A and 61A. Afterwards, the brake pad 29A is shifted to the rotor rotational outlet side, and the protrusion segment 92A located at the rotor rotational outlet side is introduced into a position of the pad guide 42 located at the side of the cylinder part 11 between the cover plate portion 125A and the mounting plate portion 121A of the pad retainer 28A installed on the pad support 40A. Thereby, as shown in FIG. 23A, the rotor rotational outlet side of the brake pad 29A is located at the position of the pad guide 42 located at the side of the cylinder part 11.

Figure 23B:
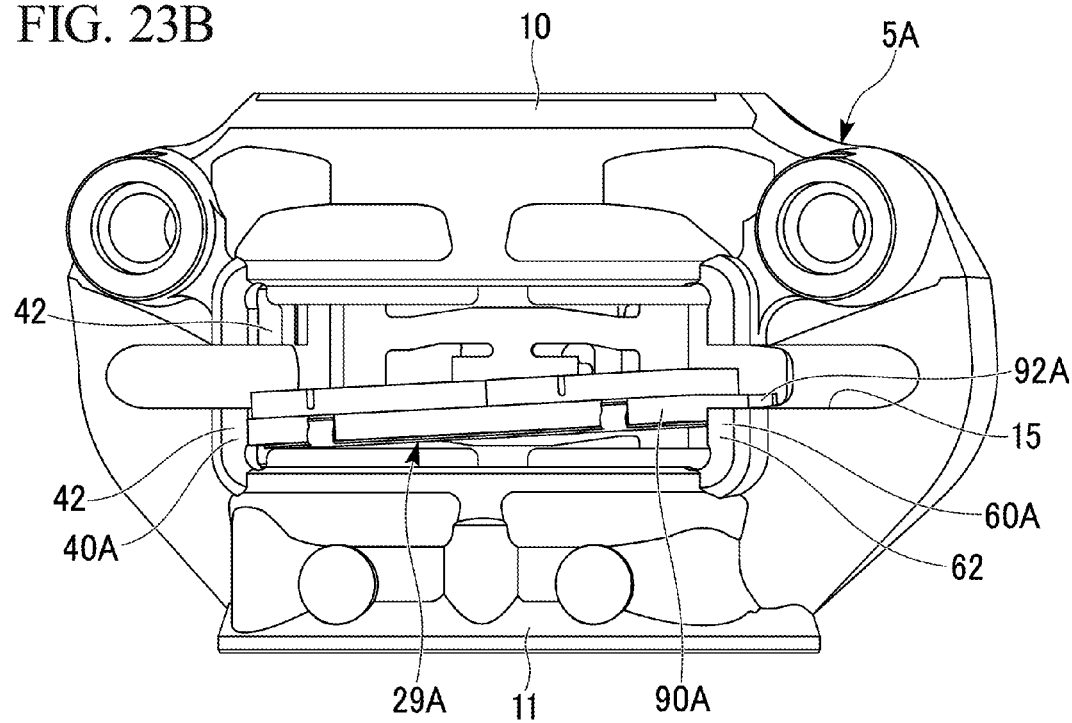
FIG. 23B is a cross-sectional view showing a process of assembling the brake pads of the disc brake of the second embodiment according to the present invention when the brake pad is assembled.

Next, the protrusion segment 92A located at the rotor rotational inlet side is caused to pass through the caliper-side cutout 75A formed in the pad support 60A located at the rotor rotational inlet side and to be located at the outer side in the rotor radial direction relative to the intermediate extensions 41A and 61A. Afterwards, as shown in FIG. 23B, the protrusion segment 92A located at the rotor rotational inlet side of the brake pad 29A is shifted to the side of the cylinder part 11. In this case, the protrusion segment 92A located at the rotor rotational inlet side is shifted while being introduced between the cover plate portion 125A and the mounting plate portion 121A of the pad retainer 28A located at the rotor rotational inlet side. Then, the liner 90A of the brake pad 29A is introduced between the cover plate portion 125A and the mounting plate portion 121A of the pad retainer 28A installed on the pad support 60A located at the rotor rotational inlet side, and is located at the positions of the pad guides 42 and 62 located at the side of the cylinder part 11.

As described above, in the brake pad 29A disposed at the side of the cylinder part 11, the protrusion segments 92A and 92A overlap the position in the rotor axial direction with the pad guides 42 and 62 located at the side of the cylinder part 11 in the rotor axial direction of the caliper main body 5A. One protrusion segment 92A overlaps the position in the rotor rotational direction with the pad guide 42, and the other protrusion segment 92A overlaps the position in the rotor rotational direction with the pad guide 62. As a result, the caliper main body 5A is in a state in which the pad guides 42 and 62, which are located at the side of the cylinder part 11 in the rotor axial direction and at both sides in the rotor rotational direction, support the brake pad 29A located at the side of the cylinder part 11 by way of the pad retainers 28A and 28A.

In this state, the brake pad 29A located at the side of the cylinder part 11 brings the face 104 located at the rotor rotational outlet side into contact with the curved plate portion 163A of the biasing segment 152A of the rotor rotational outlet side of the pad spring 31A, and brings the face 202 into contact with the curved plate portion 163A of the biasing segment 152A located at the rotor rotational inlet side. Thereby, the brake pad 29A located at the side of the cylinder part 11 is biased in the rotor rotational outlet direction and inward in the rotor radial direction by the biasing segment 152A located at the rotor rotational outlet side, and is biased inward in the rotor radial direction by the biasing segment 152A located at the rotor rotational inlet side. Thereby, the brake pad 29A is pushed to the mounting plate portions 121A and 121A of the pad retainers 28A and 28A, and is pushed to the torque receiving face 46.

Next, another brake pad 29A is adapted to assume such a posture that the protrusion segments 92A and 92A are disposed at the outer side in the rotor radial direction, and that the liner 90 is directed to the side of the cylinder part 10. Similarly to the foregoing, the protrusion segment 92A located at the rotor rotational outlet side that is the outer side in the rotor radial direction is slantly introduced into the position of the pad guide 42 located at the side of the cylinder part 10 between the cover plate portion 125A and the mounting plate portion 121A of the pad retainer 28A installed on the pad support 40A first. Afterwards, the protrusion segment 92A located at the rotor rotational inlet side is caused to pass through the caliper-side cutout 75A formed in the pad support 60A located at the rotor rotational inlet side, and is then shifted in the rotor axial direction so as to come close to the cylinder part 10. Thereby, the pad guides 42 and 62 located at the side of the cylinder part 10 supports the brake pad 29A located at the side of the cylinder part 10 via the pad retainers 28A and 28A. Of course, the brake pad 29A located at the side of the cylinder part 10 may be installed on the caliper 3A first, and then the brake pad 29A located at the side of the cylinder part 11 may be installed on the caliper 3A.

According to the disc brake 1A of the second embodiment described above, the caliper-side cutout 75A is formed only in the pad support 60A, which is located at the rotor rotational inlet side, of the pad supports 40A and 60A located at both sides in the rotor rotational direction. For this reason, it is possible to improve strength of the pad support 40A that is located at the rotor rotational outlet side and independently receives brake torque in the event of forward braking, and to suppress brake noise. Further, when the brake pad 29A is installed, the protrusion segment 92A located at the rotor rotational outlet side is supported to the pad guide 42 first. In this state, it is possible to shift the brake pad 29A in the rotor radial direction. As such, the shifting in the rotor radial direction resisting a pressing force of the pad spring 31A is facilitated. Accordingly, the workability of the installation of the brake pads 29A and 29A can be improved.

Further, the pressing plate portions 162A and 162A of the biasing segments 152A and 152A of the pad spring 31A have the shape continuing from the inner side to the outer side of the disc rotor 2. In other words, the pressing plate portions 162A and 162A are formed across the pair of brake pads 29A and 29A so as to continuously extend in the rotor axial direction. As such, even when the brake pads 29A and 29A are shifted from the middle in the rotor axial direction of the biasing segment 152A when installed, they can be smoothly shifted without snagging. Accordingly, the workability of the installation of the brake pads 29A and 29A can be improved.

The pair of arm plate portions 161A and 161A of the pad spring 31A is adapted to form the same plane as the base plate portion 150 and to extend from the base plate portion 150 without slantly extending from the base plate portion like the arm plate portion 161 of the first embodiment. As such, it is possible to reduce bending work when the pad spring is manufactured, and the pad spring is easily manufactured.

Third Embodiment

Next, a disc brake according to a third embodiment of the present invention will be described mainly based on FIGS. 24 and 25 focusing on portions different from those of the first embodiment. Note that portions common to the first and second embodiments will be given the same names and reference numbers.

Figure 25A:
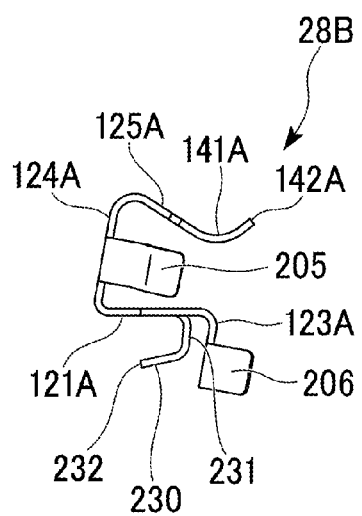
FIG. 25A is a side view showing a pad retainer of the disc brake of the third embodiment according to the present invention.
Figure 25B:
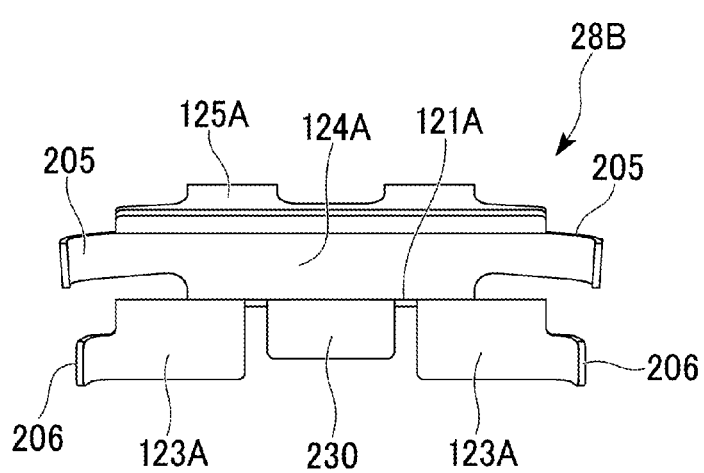
FIG. 25B is a front view showing the pad retainer of the disc brake of the third embodiment according to the present invention.

In a disc brake 1B of a third embodiment, a pad retainer 28B is used instead of the pad retainer 28 of the first embodiment. The pad retainer 28B is partly different from the pad retainer 28A of the second embodiment. As shown in FIGS. 25A and 25B, the pad retainer 28B has a locking segment 230 extending between contact plate portions 123A and 123A of a mounting plate portion 121A. The locking segment 230 has an intermediate plate portion 231 that extends from the mounting plate portion 121A in a direction opposite to a standing plate portion 124A in a thickness direction of the mounting plate portion 121A, and a locking plate portion 232 that extends from an extension tip of the intermediate plate portions 231 to a side of the standing plate portion 124A in a depth direction of the pad retainer 28A. Further, in the third embodiment, the brake pad 29A of the second embodiment is used.

Figure 24:
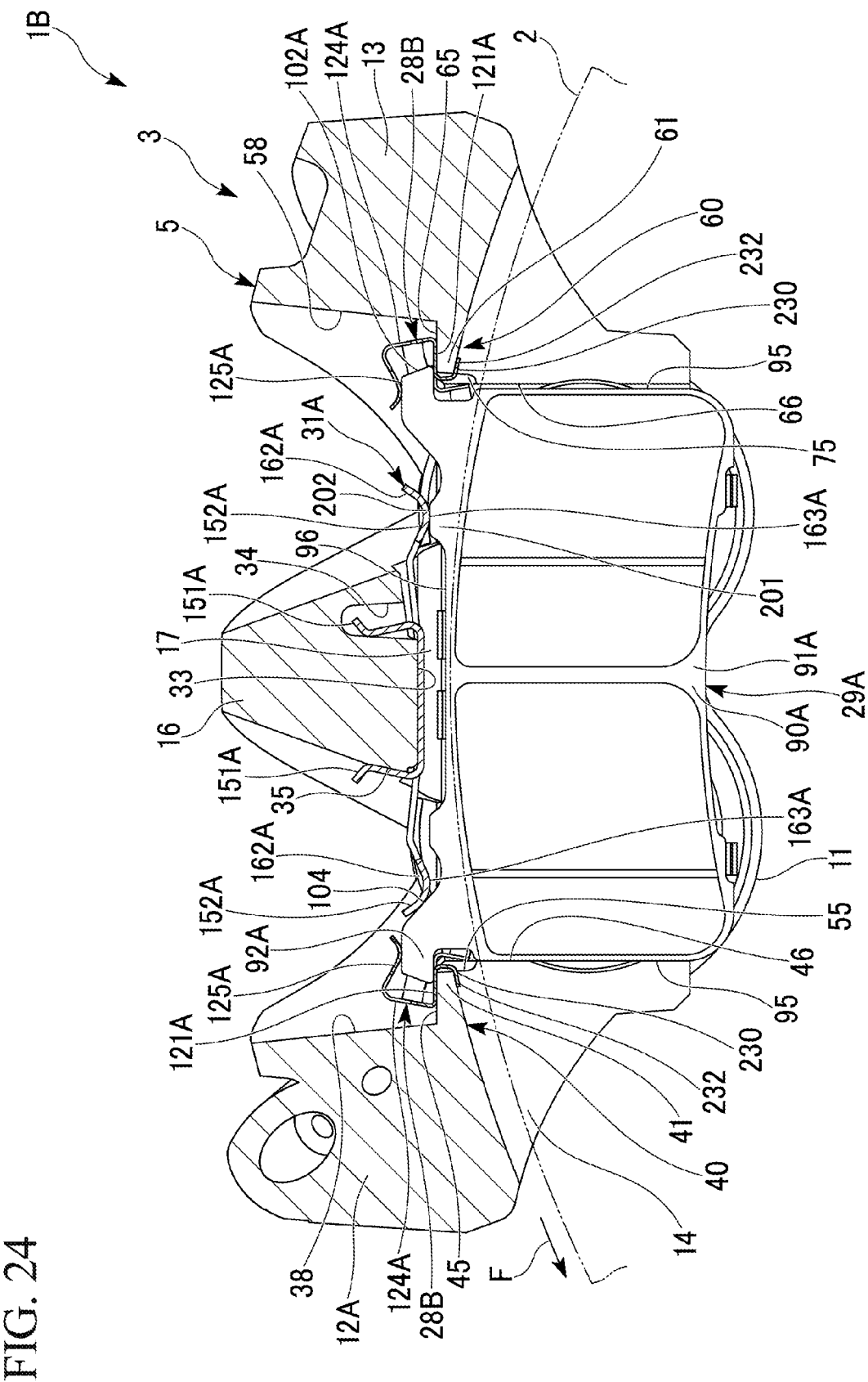
FIG. 24 is a cross-sectional view showing a disc brake of a third embodiment according to the present invention.

As shown in FIG. 24, when the pad retainer 28B is installed on a pad support 40, the locking plate portion 232 is locked to an inner side in a rotor radial direction of an intermediate extension 41, and shifting outward in the rotor radial direction is prevented. Likewise, even when the pad retainer 28B is installed on a pad support 60, the locking plate portion 232 is locked to an inner side in a rotor radial direction of an intermediate extension 61, and shifting outward in the rotor radial direction is prevented. Thereby, when the brake pads 29A and 29A are installed, even when a force exerted outward in the rotor radial direction is applied to the pad retainers 28B and 28B via the brake pads 29A and 29A, the pad retainers 28B and 28B do not easily deviate from the pad supports 40 and 60. Accordingly, the workability of the installation of the brake pads 29A and 29A can be improved.

The disc brake using the pad retainer 28B can be expressed as follows.

The disc brake includes at least one pair of brake pads disposed to be opposite to the disc rotor, and a caliper main body that supports the brake pads so as to be capable of being pressed to the disc rotor. The caliper main body has a pair of cylinder parts in which pistons configured to press the brake pads are housed, a pair of end-side connector parts that extend over the disc rotor at ends in a disc rotor rotational direction of the pair of cylinder parts and connect the pair of cylinder parts, and an intermediate connector part that is installed between the pair of end-side connector parts and connects the pair of cylinder parts across over the disc rotor and the pair of brake pads. At least one of the pair of brake pads is provided with protrusion segments at positions thereof which are outer circumference sides of the disc rotor. The protrusion segments protrude in directions separating from the middles of the brake pads in the rotational direction of the disc rotor. In the pair of end-side connector parts, pad engaging parts on which inner regions in a disc rotor radial direction of the protrusion segments are oppositely disposed are formed by the same member as the caliper main body. A retainer is disposed on the pad engaging part, covers the pad engaging part over a disc axial direction of the pad engaging part, and is supported to the caliper main body at a plurality of places by each of both ends of the disc axial direction.

The retainer is assembled by shifting in the direction separating from the middles of the brake pads in the rotational direction of the disc rotor. Further, a retainer stopper restraining the retainer from being shifted outward in the disc radial direction after the retainer is assembled is provided.

The present embodiment described above is characterized by including at least one pair of brake pads disposed to be opposite to a disc rotor, and a caliper main body configured to support the brake pads so as to be capable of being pressed to the disc rotor, wherein: the caliper main body includes a pair of cylinder parts in which pistons adopted to press the brake pads are housed, a pair of end-side connector parts that extend over the disc rotor at ends in a rotor rotational direction of the pair of cylinder parts and that connect the pair of cylinder parts, and an intermediate connector part that is installed between the pair of end-side connector parts and that connects the pair of cylinder parts across over the disc rotor and the pair of brake pads; at least one of the pair of brake pads includes protrusion segments that are formed at positions that are outer end sides in a rotor radial direction and that protrude in directions separated from middle portions of the brake pads in the rotor rotational direction; and the pair of end-side connector parts include pad engaging faces on which inner regions in the rotor radial direction of the protrusion segments are oppositely disposed and which are formed of the same member as the caliper main body. Thereby, it is unnecessary to provide a separate member to support the brake pad. As such, it is possible to reduce weight of the disc brake.

Further, the pair of end-side connector parts include disc path parts through which the disc rotor passes and pad guides formed at both sides in a rotor axial direction of the disc path parts to guide the pair of brake pads, and the brake pads include pad-side cutouts that are formed at inner sides in the rotor radial direction relative to the protrusion segments and that are recessed toward middle sides of the brake pads in the rotor rotational direction. Thereby, it is possible to easily dispose the protrusion segments of the brake pads on the pad guides.

It is characterized in that the pad-side cutouts are formed with such dimensions that, when the pad-side cutouts come into contact with contact positions that are inner regions in the rotor radial direction relative to the pad engaging faces of the end-side connector parts and that match the disc path parts in the rotor axial direction, middle positions of the brake pads in the rotor rotational direction are offset toward the contact positions relative to the center between the pad guides in the rotor rotational direction. Thereby, it is possible to easily dispose the protrusion segments of the brake pads on the pad guides.

Further, the pair of end-side connector parts include disc path parts through which the disc rotor passes and pad guides formed at both sides in a rotor axial direction of the disc path parts to guide the pair of brake pads, and the pad engaging faces include caliper-side cutouts formed at positions matching the disc path parts in the rotor axial direction and to be partly recessed toward an outside of the caliper main body in the rotor rotational direction. Thereby, it is possible to easily dispose the protrusion segments of the brake pads on the pad guides.

It is characterized in that contact positions of the caliper-side cutouts are formed with such dimensions that, when inner positions in the rotor radial direction relative to the protrusion segments of the brake pads come into contact with the contact positions of the caliper-side cutouts, the middle positions of the brake pads in the rotor rotational direction are offset toward the contact positions relative to the center between the pad guides in the rotor rotational direction. Thereby, it is possible to easily dispose the protrusion segments of the brake pads on the pad guides.

While preferred embodiments of the present invention have been described, the present invention is not limited to the embodiments. Additions, omissions, substitutions, and other variations of the constitution are possible without departing from the spirit and scope of the present invention. The present invention is not limited by the above description, but by the appended claims.

What is claimed is:

1. A disc brake comprising:
    at least one pair of brake pads disposed to be opposite to a disc rotor; and
    a caliper main body configured to support the brake pads so as to be capable of being pressed to the disc rotor, wherein the caliper main body includes:
        a pair of cylinder parts in which pistons adapted to press the brake pads are housed;
        a pair of end-side connector parts configured to extend over the disc rotor at ends in a rotor rotational direction of the pair of cylinder parts and to connect the pair of cylinder parts; and
        an intermediate connector part installed between the pair of end-side connector parts and to connect the pair of cylinder parts across over the disc rotor and the pair of brake pads, wherein
    a pad spring is installed between the intermediate connector part and the pair of brake pads so as to bias the pair of brake pads;
    at least one of the pair of brake pads includes a pair of protrusion segments formed at positions that are outer end sides in a rotor radial direction and to protrude in directions separated from middle portions of the brake pads in the rotor rotational direction, and
    the pair of end-side connector parts respectively includes:
        disc path parts which the disc rotor passes through, and
        pad guides which are formed at both sides in a rotor axial direction of the disc path part and which movably support the pair of brake pads in the rotor axial direction, and
        pad engaging faces on which inner regions in the rotor radial direction of the protrusion segments are oppositely disposed and which support the brake pads in the rotor radial direction are formed of the same member as the caliper main body,
    wherein the inner regions in the rotor radial direction of the protrusion segments and the pad engaging faces face each other and are parallel with each other,
    wherein the pad spring is arranged so that a biasing force of the pad spring is transferred to the pad engaging faces via the inner regions in the rotor radial direction of the protrusion segments, and
    wherein at least one of the pad engaging faces of the pair of end-side connector parts is located at an outer side in the rotor radial direction relative to the disc rotor, crosses the disc rotor to continue to both sides in the rotor axial direction and forms an end face of the pad guide located at the outer side in the rotor radial direction.

2. The disc brake according to claim 1, wherein:
    pad-side cutouts located at inner sides in the rotor radial direction relative to the protrusion segments and to be recessed toward middle sides of the brake pads in the rotor rotational direction are formed at both sides in the rotation direction of the brake pad, respectively.

3. The disc brake according to claim 2, wherein caliper-side cutouts located at positions matching the disc path parts in the rotor axial direction and to be partly recessed toward an outside of the caliper main body in the rotor rotational direction are formed on at least one of the pad engaging faces.

4. The disc brake according to claim 3, wherein:
    the caliper-side cutouts are formed at both of the pad engaging faces, and
    a distance between a face of one pad-side cutout in the rotor rotational direction and a face of the protrusion segment in the rotor rotational direction which is disposed at a side opposite to the one pad-side cutout in the rotor rotational direction is shorter than a distance between one caliper-side cutout and the other caliper-side cutout which faces the one caliper-side cutout.

5. The disc brake according to claim 1, wherein:
    at least one of the pad engaging faces includes caliper-side cutouts formed at positions matching the disc path parts in the rotor axial direction and to be partly recessed toward an outside of the caliper main body in the rotor rotational direction.

6. The disc brake according to claim 1, wherein:
    the caliper main body is formed of the same member as the end-side connector part and the intermediate connector part and is formed in one body with the end-side connector part and the intermediate connector part.

7. The disc brake according to claim 1, wherein:
    at least one of the pair of the end-side connector parts includes one intermediate extension which is disposed at a position matching the disc path part, and
    an end face at an outer side of the one intermediate extension in the rotor radial direction and an end face at an outer side of the pad guides in the rotor radial direction have a substantially same plane with the pad engaging face.

8. The disc brake according to claim 7, wherein:
    the other one of the pair of the end-side connector parts includes the other intermediate extension which is disposed at a position matching the disc path part, and
    an end face at an outer side of the other intermediate extension and an end face at an outer side of the pad guides in the rotor radial direction have a same plane with the pad engaging face.

9. The disc brake according to claim 1, wherein:
    the pad engaging faces are covered with pad retainers, and
    the protrusion segments come into contact with portions of the pad retainers that cover the pad engaging faces.

10. A disc brake comprising:
    at least one pair of brake pads disposed to be opposite to a disc rotor; and
    a caliper main body configured to support the brake pads so as to be capable of being pressed to the disc rotor, wherein the caliper main body comprises:
        a pair of cylinder parts in which pistons adapted to press the pair of brake pads are housed,
        a pair of end-side connector parts configured to extend over the disc rotor at ends in a rotor rotational direction of the pair of cylinder parts and to connect the pair of cylinder parts, and an intermediate connector part installed between the pair of end-side connector parts and to connect the pair of cylinder parts across over the disc rotor and the pair of brake pads, wherein the pair of cylinder parts, the pair of end-side connector parts, and the intermediate connector part are formed of the same member, wherein a pad spring is installed between the intermediate connector part and the pair of brake pads so as to bias the pair of brake pads, wherein the pair of brake pads include a pair of protrusion segments formed at positions that are outer end sides in a rotor radial direction and to protrude in directions separated from middle portions of the brake pads in the rotor rotational direction, and wherein the pair of end-side connector parts respectively includes:
- disc path parts which the disc rotor passes through, and pad guides which are formed at both sides in a rotor axial direction of the disc path part and which movably support the pair of brake pads in the rotor axial direction, and
- pad engaging faces to which inner regions in the rotor radial direction of the pair of protrusion segments are supported are located at an outer side in the rotor radial direction relative to the disc rotor, crosses the disc rotor to continue to both sides in the rotor axial direction and forms an end face of the pad guide located at the outer side in the rotor radial direction, wherein the inner regions in the rotor radial direction of the protrusion segments and the pad engaging faces face each other and are parallel with each other, and wherein the pad spring is arranged so that a biasing force of the pad spring is transferred to the pad engaging faces via the inner regions in the rotor radial direction of the protrusion segments.

11. The disc brake according to claim 10, wherein:
pad-side cutouts located at inner sides in the rotor radial direction relative to the protrusion segments and to be recessed toward middle sides of the brake pads in the rotor rotational direction are formed at both sides in the rotation direction of the brake pad, respectively.

12. The disc brake according to claim 10, wherein:
caliper-side cutouts located at positions matching the disc path parts in the rotor axial direction and to be partly recessed toward an outside of the caliper main body in the rotor rotational direction are formed at the pad engaging faces, respectively.

13. The disc brake according to claim 10, wherein:
the pad engaging faces are covered with pad retainers, and the protrusion segments come into contact with portions of the pad retainers that cover the pad engaging faces.

* * * * *